United States Patent [19]

Neville et al.

[11] 3,956,546

[45] May 11, 1976

[54] ZERO DEGREE BELTED TIRES, AND HIGH SOFT STRETCH BELT-FORMING TAPES THEREFOR

[75] Inventors: James J. Neville, Kinnelon; Wesley Ferrell, Wayne; Daniel Shichman, Cedar Grove, all of N.J.

[73] Assignee: Uniroyal Inc., New York, N.Y.

[22] Filed: July 8, 1971

[21] Appl. No.: 160,675

[52] U.S. Cl. .................................. 428/43; 428/181; 428/184; 428/229; 428/257; 428/369; 428/390; 156/117; 156/128 R
[51] Int. Cl.² ........................................ D03D 11/00
[58] Field of Search .................. 161/57, 60, 77, 82, 161/88, 101, 142, 90, 92; 152/354, 357, 361; 156/117, 245; 428/43, 113, 156, 180, 181, 183, 184, 257, 292, 294, 295

[56] References Cited
UNITED STATES PATENTS

| | | | |
|---|---|---|---|
| 993,465 | 5/1911 | Sloper | 156/117 |
| 2,202,013 | 5/1940 | Lougheed | 161/143 |
| 2,491,396 | 12/1949 | Sechel | 161/92 |
| 2,982,327 | 5/1961 | Vanzo et al. | 156/128 |
| 2,982,328 | 5/1961 | Emanueli et al. | 156/128 |
| 3,252,833 | 5/1966 | Skobel | 273/72 |
| 3,283,389 | 11/1966 | Nisbet et al. | 161/89 |
| 3,316,610 | 5/1967 | Manock | 161/76 |
| 3,345,228 | 10/1967 | Kovac et al. | 156/110 R |
| 3,422,874 | 1/1969 | Weitzel | 156/110 |
| 3,438,842 | 4/1969 | Petterson et al. | 161/77 |
| 3,446,252 | 5/1969 | Maxham | 161/91 |
| 3,486,546 | 12/1969 | Sidles et al. | 152/354 |
| 3,565,740 | 2/1971 | Lazar et al. | 161/57 |

*Primary Examiner*—George F. Lesmes
*Assistant Examiner*—James J. Bell
*Attorney, Agent, or Firm*—Norbert P. Holler

[57] ABSTRACT

The single-stage building of 0° belted pneumatic tires completely in flat band form on standard building drums, is disclosed. The feasibility of the process rests on the provision of the substantially inextensible metallic or non-metallic belt cords in the form of longitudinally extensible high "soft stretch" tapes. In a preferred version of the invention, the tape is composed of a plurality of cords each having formed therein a multiplicity of undulations which in any given straight length of the tape are substantially planar, the cords being disposed in side by side relation so that the planes of the undulations of each cord are generally parallel to the planes of the undulations of each adjacent cord, and the cords together with a relatively weak and frangible but only minimally undulated stabilizing yarn for the tape being secured to each other and held in their undulating state by a relative weak, chain stitch knitted, frangible stitching yarn or thread. The belt-forming structure is built by helically winding such tape circumferentially of the building drum in the medial region of the still cylindrical or flat band carcass at an angle of substantially 90° to a plane including the common axis of the carcass and the building drum, with the undulations of the cords "on end", i.e. in planes generally normal to the surface of the building drum. Upon the raw tire then being radially expanded into its toroidal form, the stabilizing and stitching yarns break and the cords are straightened out, resulting in the formation of a mono-ply, plural-lead, helical cord 0° belt in the shaped tire. The "soft stretch" of the tape used, i.e. the ratio of the length of the component cords when fully straightened without stretching, to the length of the unextended tape, may be as low as about 20% or as high as about 400%, depending on the extent to which, for any given tire, the belt-forming structure will have to expand radially from its starting diameter on the building drum to the final belt diameter in the toroidally shaped tire. Each cord may additionally be locally weakened at a multiplicity of longitudinally spaced points to facilitate a possible stretching or elongation of the cords after the same have been fully straightened out during the radial expansion of the belt. In any such tape, the component cords must be phased relative to each other to dispose the respective weakened portions of each cord out of lateral alignment with the weakened portions of at least each next adjacent cord, and the weakening interval should preferably be so selected that in the final belt the weakened portions are out of lateral alignment with each other in directions parallel to the tire axis. The full nature and extent of the invention is discernible, however, only by reference to the entire disclosure.

62 Claims, 35 Drawing Figures

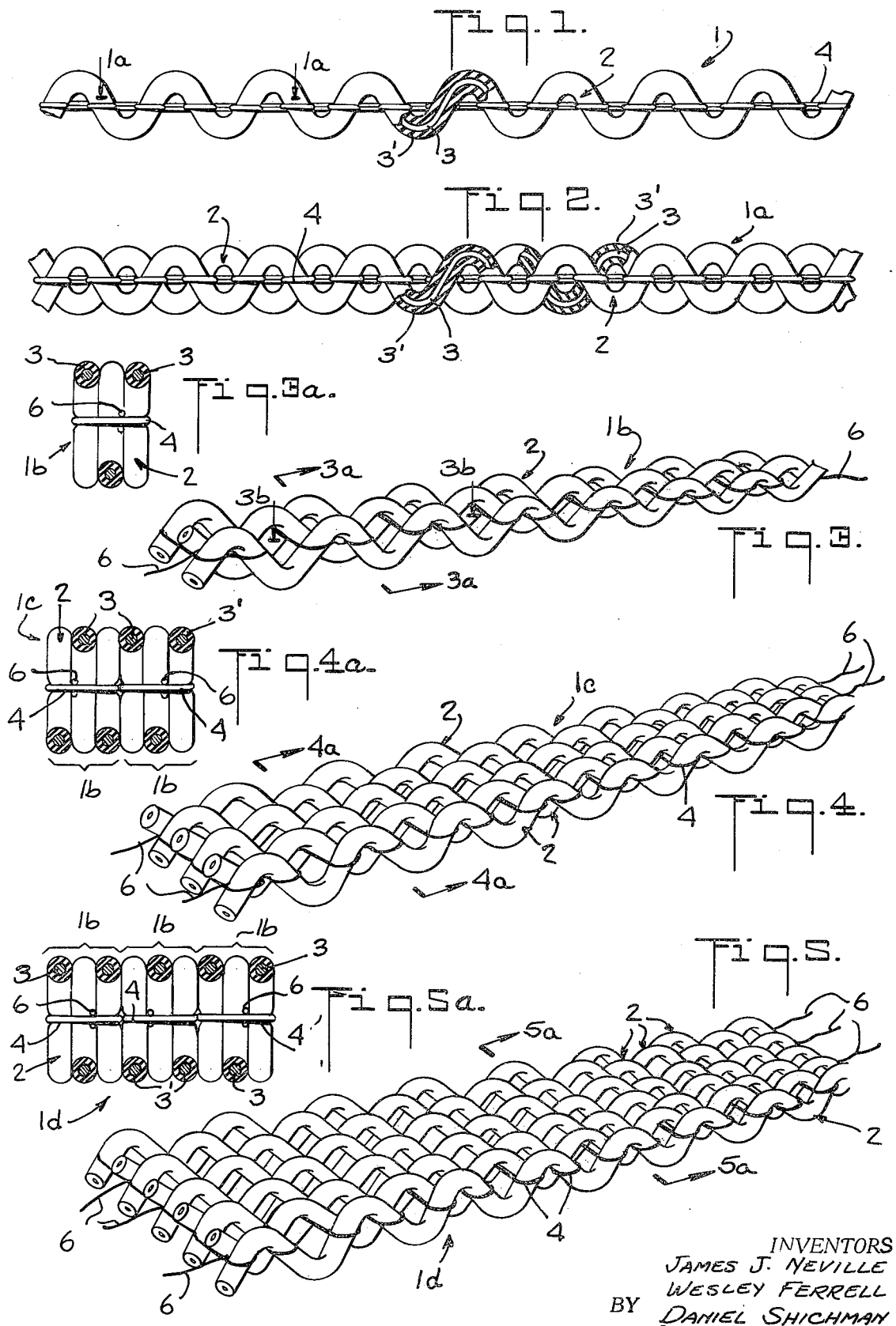

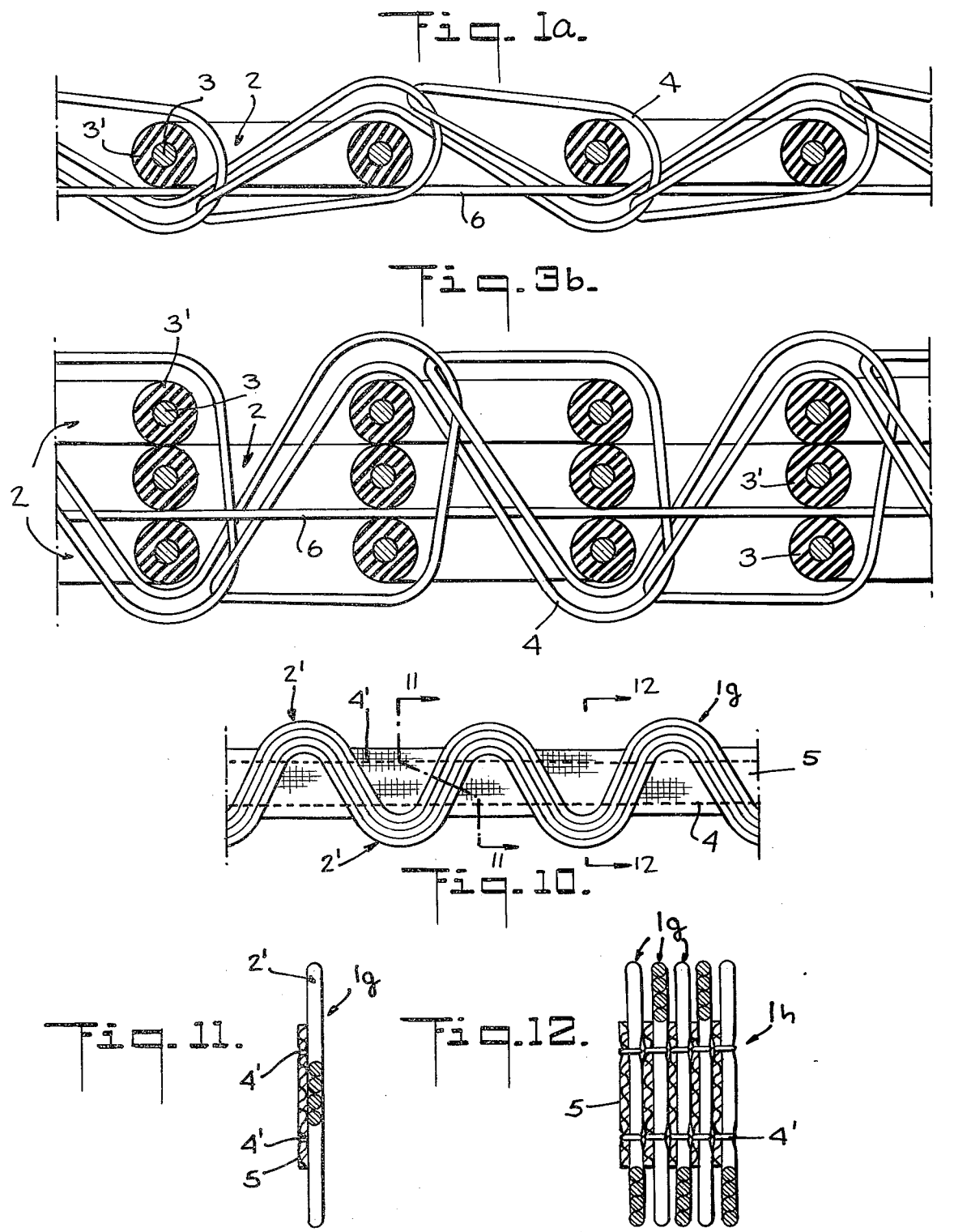

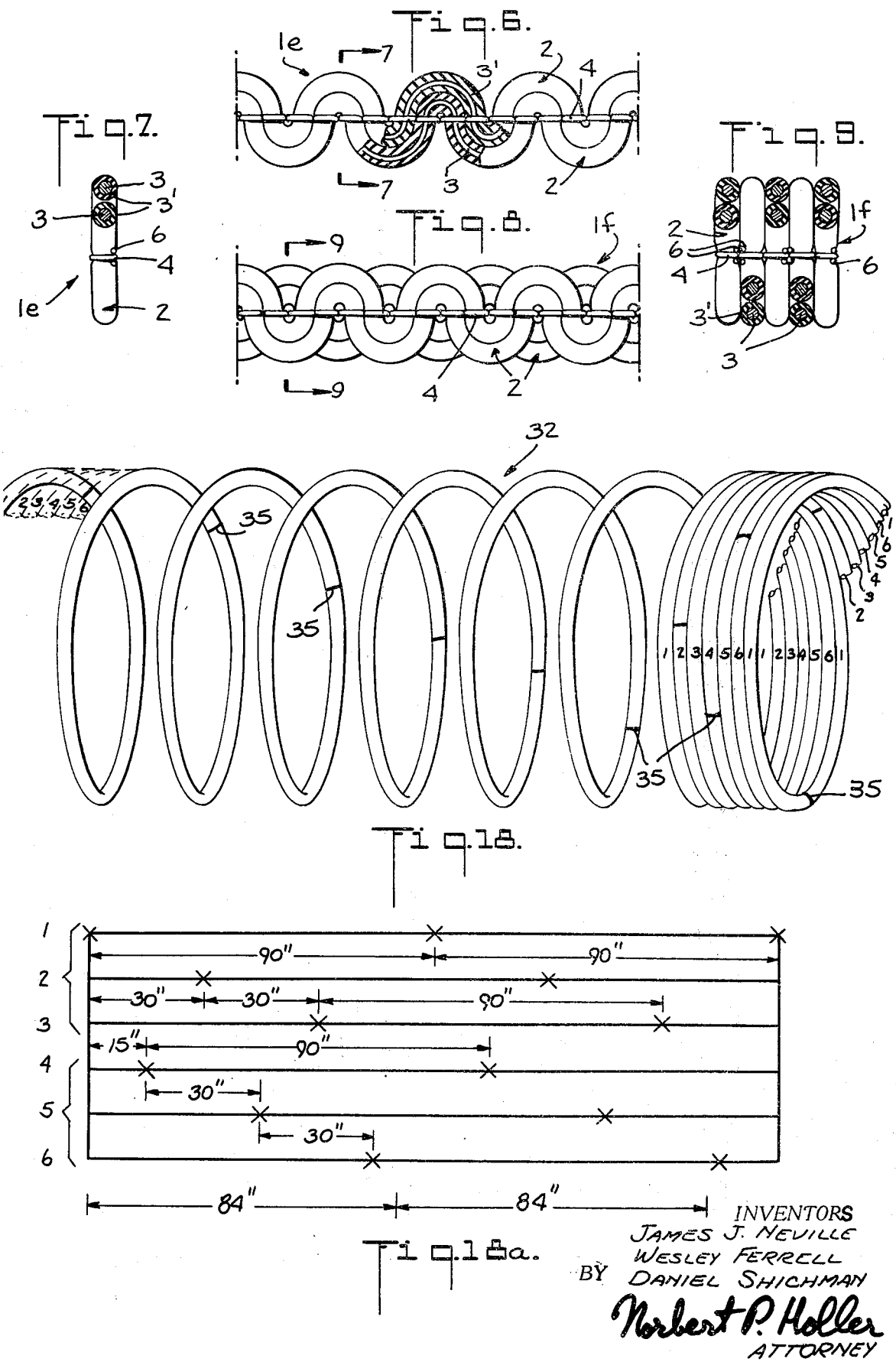

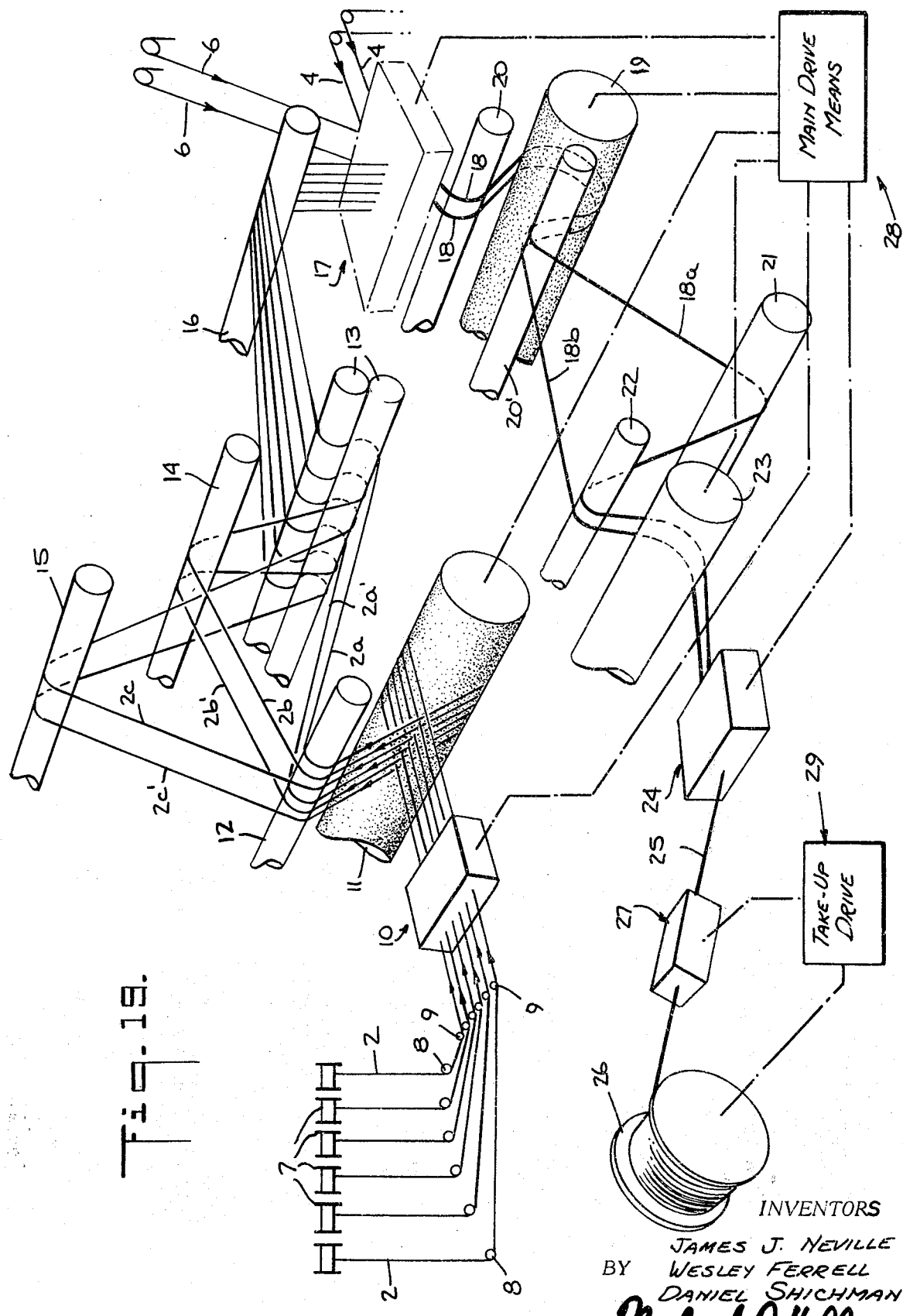

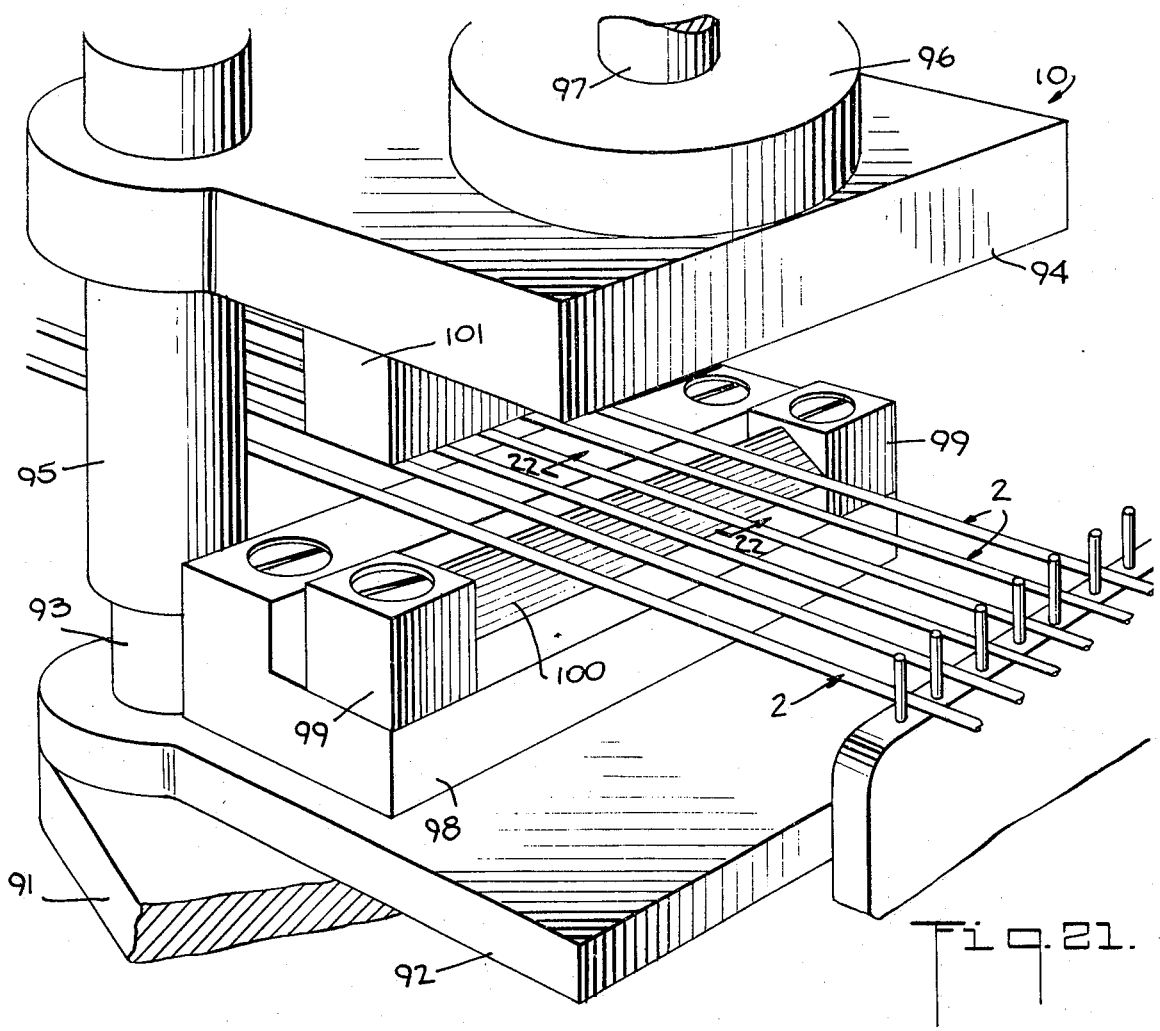
Fig.21.
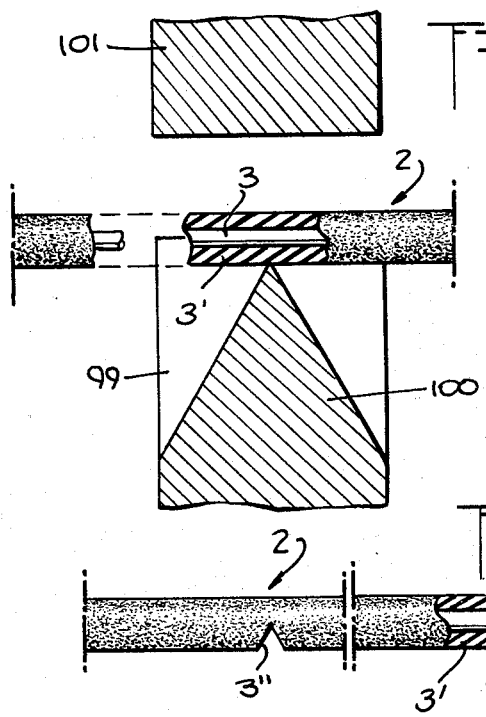
Fig.22.   Fig.22a.
Fig.20.
INVENTORS
JAMES J. NEVILLE
WESLEY FERRELL
BY DANIEL SHICHMAN
Norbert P. Holler
ATTORNEY

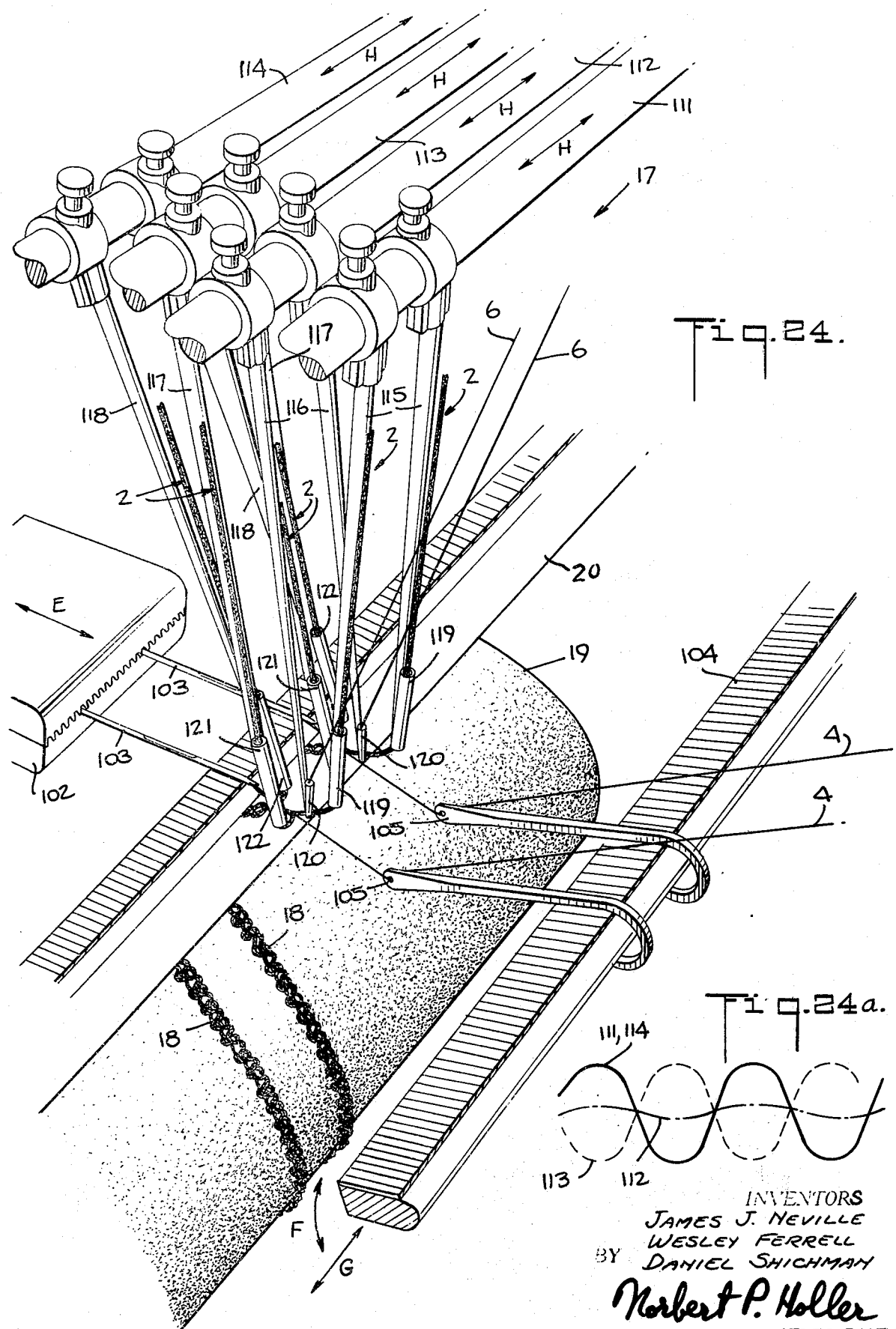

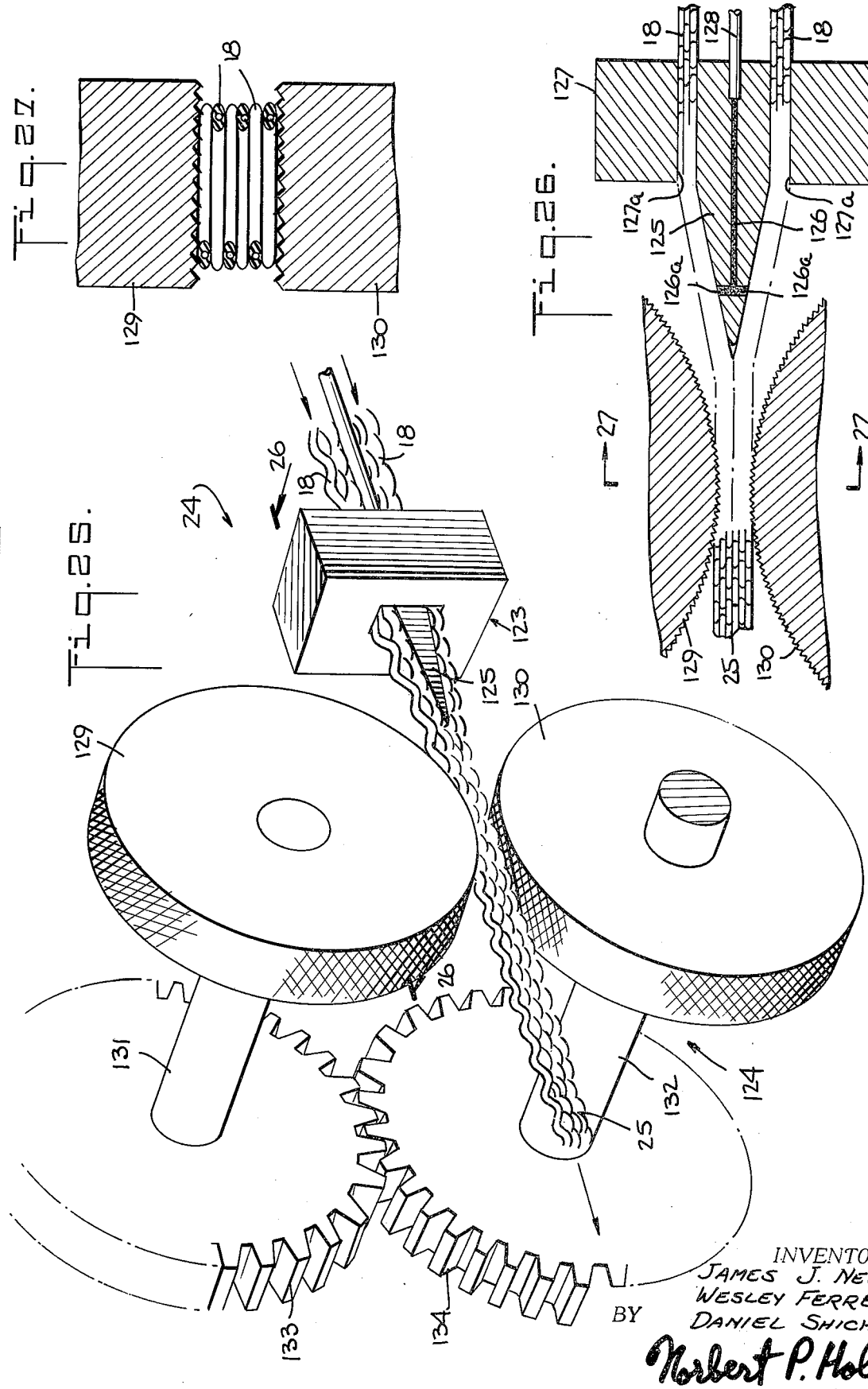

ZERO DEGREE BELTED TIRES, AND HIGH SOFT STRETCH BELT-FORMING TAPES THEREFOR

This invention relates to 0° belted pneumatic rubber tires, as well as to high "soft stretch" tapes made of substantially inextensible reinforcing cords and adapted for use in the building and production of 0° belted tires and in particular for use in the formation of the belts of such tires.

Improving both the safety and the service life of pneumatic vehicle tires has been a goal of the tire industry for many years, with much attention being focused on such tire characteristics as tread wear, handling and road-holding ability, especially during cornering. In this regard, the desirability of producing tires with a broadened "footprint" (the portion of a tire tread in contact with the road surface when the tire is under load on a moving vehicle) has long been recognized.

A major step in this direction has been the advent of the belted tire, wherein a circumferentially extending belt or belt-like structure is incorporated under the tread in the crown region of the tire carcass so as to introduce a degree of restraint into the deformability of the tread. In such tires, as is well known, the belt is made of one or more plies of generally inextensible reinforcing cords which, in any given ply, are parallel to each other and confined between ply-wide skim coats of rubber and may be oriented at a predetermined angle of up to about 35° or so to the median equatorial or mid-circumferential plane of the tire. Such plies are generally provided in pairs, with the cords in paired plies being oriented at equal but opposite angles to said plane.

It should be noted, by way of definition, that in this specification and the appended claims, the terms "0° belt" and "0° belted" are used to describe tire constructions in which the belt cords are oriented either truly circumferentially of the tire or at an angle of substantially 0°, i.e. preferably less than 1° but in any event no more than about 2°, to that direction. The terms "bias belt" and "bias belted" are used to describe tire constructions in which the belt cords are oriented at angles greater than 2° relative to the circumferential direction. The term "low angle" is used to designate bias belts having a cord angle of up to about 25° to the circumferential direction, while the term "high angle" is used to designate bias belts having a cord angle above about 25° to the circumferential direction. The term "rubber" as used herein is intended to denote both natural and synthetic rubbers or rubber-like materials, and blends thereof, specific formulations of which for a wide variety of different tire applications are well known and need not be explicitly set forth herein. The term "substantially inextensible" is used herein to designate the essential characteristic of filamentary reinforcing cords, which may be made of metallic materials such as steel wire or the like or of nonmetallic materials such as cotton, rayon, nylon, polyester, polyvinyl alcohol, glass fiber, or the like, of being able to withstand, without substantial elongation, the tensile stresses in the belt normally encountered in service.

In the U.S., at least, as far as we are aware, the production of 0° belted tires has not been entered into by the industry on a major scale, especially in the areas of passenger, truck and other on-the-road tires, because of certain manufacturing drawbacks and disadvantages which have been encountered. Principally, this has been due to the fact that, by virtue of the inextensibility of the belt cords, the production of 0° belted tires has generally required a two-stage building operation, in which the beltless carcasses are built on relatively low diameter cylindrical drums and are then, either at the carcass building station or at a different station, first shaped into toroidal form on specially constructed radially expansible and axially collapsible drums before the belt and tread are applied. Representative illustrations of the prior art 0° belted tire technology are set forth in U.S. Pat. Nos. 2,939,502 and No. 2,982,328. Two-stage tire building installations, however, are both complex and expensive, and their being put into general use would have entailed the intolerable economic burden of not only discarding single-stage building installations such as have heretofore been used for building beltless conventional tires completely in flat band or cylindrical form, but of effecting major modifications of the associated tire molds and presses as well.

As is known, methods of single-stage building (as herein defined) of belted tires have of late been proposed, but these have been directed toward the production of bias belted tires characterized by oblique orientations of the belt cords relative to the mid-circumferential plane. Representative illustrations of this technology are set forth in U.S. Pat. Nos. 3,486,546 and No. 3,558,389. In such methods, the belt cords are arranged in calendered cord fabric ply systems which are bias cut, and these are so applied to the carcass that the belt cords are oriented at relatively high angles to the mid-circumferential plane during the building operation and then, during the shaping of the tires in the press, pantograph down to somewhat lower angles to the mid-circumferential plane. Any such plies must, however, be spliced at their abutting or overlapped ends, which introduces a source of possible errors and defects into the tire structures. In the said U.S. Pat. No. 3,486,546, further, it has also been suggested that stretchable cords be used in the belt plies in lieu of the conventional cords, each such cord being composed of one or more reinforcing yarns helically wrapped at a wide pitch about an elongated, precured, rubber core. In such a system, the ply splicing problem nevertheless remains, and the use of stretchable cords in the plies does not eliminate the pantographing thereof during the shaping operation. The elongation of such stretchable cords, of course, gives rise to yet another problem, in that a high degree of twist is imparted to the cords and the core is not only not eliminated but remains confined between the cord turns. Moreover, in any bias belted tire, by virtue of the oblique belt cord orientations, the hoop modulus of the tire in the circumferential direction is necessarily less than the maximum hoop modulus attainable with cords oriented in the 0° direction, while at the same time the stress transfer in the shoulder regions of the tire is through rubber shear and falls off appreciably at the edges of the belt because of the cut ends of the belt cords. Thus, the performance of bias belted tires in such matters as broadened footprint, tread wear and road-holding ability tends not to be as good as that of 0° belted tires in these same areas.

It is an important object of the present invention, therefore, to provide novel and improved methods and means of building 0° belted tires entirely and economically on conventional single-stage building equipment.

More specifically, it is an important object of the present invention to provide novel high "soft stretch" reinforcing cord tape constructions designed for use in building the belt-forming structures of 0° belted tires and capable of rendering feasible the single-stage building of such tires, i.e. the building of the belt-forming structure of a 0° belted tire while the carcass of the tire is still in its original or "as built" state.

It is also an important object of the present invention to provide novel and improved 0° belted tire constructions in both the raw or "as built" and the shaped and cured states thereof.

Generally speaking, a high "soft stretch" tape according to the basic aspects of the present invention comprises a continuous, longitudinally extensible strand of one or more substantially inextensible cords each having formed therein a multiplicity of undulations which in any given straight length of the tape are substantially planar, the undulations preferably being of a generally sinusoidal nature. The term "soft stretch" is used herein to denote the ability of the tape to be longitudinally considerably extended by the straightening of its component cord or cords without the latter being stretched. The tape is made by passing the required number of individual cords, each of which may be untreated or may have a coating of rubber or latex or other rubber-adhesion promoting material pre-applied thereto, through an apparatus including an undulating and tying device by which they are both undulated and secured to each other in the desired relation, and means for controlling and synchronizing the cord feed rate into, and the tape feed rate out of, said device so as to ensure that the final tape has the desired stretch ratio (the ratio of straightened cord length to unextended tape length). The undulating and tying device preferably is a warp knitting mechanism or the like and is operated to knit a relatively weak and frangible cotton or like yarn or thread into a chain-stitch form while simultaneously therewith each cord to be included in the tape is being shuttled reciprocally across the needle path and laid into the stitches or loops of the yarn. The latter thus hold each cord in its undulating state, and where the tape includes a plurality of cords, more than one of these may also be tied to each other by the stitches. In a particularly preferred version of such a plural-cord tape, the cords are disposed side by side and laid into the stitches with the undulations of laterally adjacent cords in parallel planes and out of phase with each other. At the same time, to enhance the stability and integrity of the tape for purposes of handling, another relatively weak and frangible cotton or like thread or yarn is preferably also laid into and held by the stitches but in almost straight condition with only minimal undulation.

In accordance with a refinement of the present invention, each cord may also be provided with a multiplicity of longitudinally spaced locally weakened portions to enhance its ability to be stretched and elongated somewhat after being fully straightened out. The weakening of the cords, which may be effected mechanically, chemically, or otherwise, is preferably effected by a weakening device included in the apparatus so as to be traversed by the cords before they reach the undulating and tying device, and is carried out in such a manner as to leave them with a relatively low residual tensile strength, generally on the order of about 5 to 20% of their full tensile strength but nevertheless sufficient to permit the cords to be fed and processed through the undulating and tying device. For any given tire to be produced, the weakening interval, i.e. the cord length between successive weakened portions, is selected and preset to be different than, but not equal to a regular fraction or multiple of, the ultimately intended circumferential length of a full turn of the belt cord in the finished tire.

The apparatus, in addition to the components so far described, also includes, when a weakening device is present, means for phasing the cords entering the undulating and tying device in such a manner that when they have been fashioned into a tape, the weakened portions of each cord of that tape are out of lateral alignment with the respective weakened portions of each next adjacent cord. Where a final higher cord number tape is to be made of a plurality of lower cord number tapes, the apparatus further includes, in addition to the facilities for making as many low cord number tapes as are required, means for bringing the low cord number tapes together into side by side relation after they leave the undulating and tying device, and means for causing the tapes to adhere firmly to each other so as to create the final high cord number tape. If the cords are weakened, the apparatus will also include means for phasing the respective low cord number tapes as they leave the undulating and tying device in such a manner that when they are brought together, the weakened portions of the respective proximate or facing side cords of the tapes are out of lateral alignment with each other.

The specific natures, amplitudes and frequencies or pitch lengths of the undulations of the cords will, of course, be predetermined and controlled during the tape-forming operation to impart to the ultimate tape the required high "soft stretch". In general, the degree of "soft stretch", i.e. the stretch ratio, of the tape will depend on the extent to which, for any given tire, the belt-forming structure built up of such tape will have to expand radially from its building diameter to the final belt diameter. More particularly, the stretch ratio will be no greater than substantially equal to the expansion ratio of the tire, defined as the ratio of the diameter of the final belt in the shaped tire to the mean diameter of the belt-forming structure on the building drum (or, in other words, as the ratio of the circumferential length of one full turn of the belt cord in the shaped tire to the circumferential length of one full turn of the starting tape on the building drum). Nevertheless, although the stretch ratio may be less than the expansion ratio, it is contemplated by the present invention that it will be no smaller than the expansion ratio less the elastic strain capability of the cord in the case of an unweakened cord tape, and in the case of a weakened cord tape no smaller than the expansion ratio less approximately the capability of the cord to elongate by strain, by partial untwisting, and by ultimate rupture at the weakened portions. Merely by way of example, it is found that for most standard rim size belted passenger tires which are completely built in flat band form in a single-stage building operation prior to being shaped, a tape having a stretch ratio of between about 1.5 and 1.9 (50% and 90%) gives satisfactory results, but it will be understood that for certain types of tires the building operation may dictate the use of tape with a stretch ratio in the neighborhood of as little as about 1.2 (20%), while for other types the stretch ratio may have to be in the neighborhood of as much as about 4 (400%).

In the building of a raw or uncured 0° belted tire according to the present invention, after the necessary beads, carcass plies and other conventional tire components have been assembled on the usual low diameter drum, the belt-forming structure is built up (either on the same drum or on another one of the same diameter and either at the same station or at a different one if the carcass is being built at one place and the belt and tread rubber are to be added at another) by winding an appropriate amount of high "soft stretch" tape helically about the medial region of the still as built, e.g. cylindrical or flat band, carcass at an angle of substantially 90° to a plane including the axis of the carcass, i.e. at an angle of substantially 0° to a plane perpendicular to the said axis. The tape is preferably wound so as to dispose the undulations thereof "on end" relative to the carcass, i.e., in planes generally normal to the surface of the carcass or the drum surface. It will be understood that the tape, once properly deposited on the carcass, will not twist or shift out of its wound-on position, and the use of a tape of plural-cord width will enable a relatively large number of cords to be applied with each turn of the tape.

The winding operation may be either unidirectional or bidirectional with reference to the axis of the building drum and is continued until the tape-constituted belt-forming structure extends over the desired width of the medial region of the carcass. The rubber tread and sidewall stocks as well as any other still missing tire components are then applied to the carcass, with any tread splices being stitched under conditions ensuring that no undesired bunching of the belt cord tape turns will occur. Thereupon, the raw or "green" tire in its "as built" form is removed from the building drum and is ready to be subjected to the final shaping and curing operations.

When a so-built 0° belted raw tire is radially expanded and axially contracted into its final toroidal shape (either in the press or prior to its being put thereinto), the belt-forming structure defined by the wound-on tape is subjected to the same type of radial expansion. This almost at once causes the weak stabilizing and stitching threads or yarns to be broken, which then, insofar as is presently discernible, play no further part in the process or the tire (albeit remaining in the latter). Thereupon, as the expansion of the tire continues, the cords lose their undulations and are ultimately completely straightened out to define the belt.

In this connection it should be noted that whether the tire is to be cured in a segmented mold, in which case the belt expansion will be substantially completed before the mold is closed, or whether the tire is to be cured in a standard, unsegmented mold, in which case a small further expansion may take place after the mold is closed, the tape used may have a "soft stretch" or stretch ratio as nearly as possible exactly equal to that actually required for the full radial expansion. Preferably, however, the tape used will normally have a stretch ratio somewhat less than the full expansion ratio, say between about 1 and 3% less, so that the cords become fully straightened and the undulations disappear therefrom shortly before the shaping operation is completed. In such a case, of course, during the final expansion of the tire, e.g. upon the forcing of the tire against the mold surfaces under high internal pressure after the mold is closed, the belt cords will be subjected to fairly high tensile stresses and will stretch and elongate to the extent required. Where the cords, by virtue of their construction and the stress-strain characteristics of the cord material, can accommodate the resultant strain and elongation without exceeding their elastic limit, the fact that they are unweakened will not lead to any problems. Where the cords are locally weakened, on the other hand, they will additionally have an increased ability to undergo a "hard stretch" without adverse effect, i.e. they will be able to elongate either by the strain of the cord material, or by being able to untwist somewhat between the weakened portions, or by actually breaking at one or more of the locations of the various weakened portions thereof, or by a combination of these characteristics. The weakening of the cords of the tape at a multiplicity of longitudinally spaced points as described thus can be seen to provide a margin of safety, due to the presence of which a possible choice of a tape stretch ratio somewhat lower than ordinary relative to the tire expansion ratio can be tolerated and compensated for.

When a tape of multiple side by side cords wound "on end" is used to build the 0° belt-forming structure, the latter can be built with appreciably reduced expenditures of time and labor and the resultant belt is a plural-wind structure with the various cords in a multiple lead screw thread-like arrangement. The formation of the ultimate 0° belt is, furthermore, effected without the kind of pantographing cord movement which characterizes the known bias belted tire manufacturing operations, even though the final belt diameter in the mold is considerably greater than the starting mean diameter of the beltforming structure on the drum. At the same time, the final belt is devoid of splices, the absence of which leads to a greater degree of uniformity and dynamic balance in the finished tire. The belt is also devoid of circumferentially contiguous, obliquely laterally directed, cut cord ends in the shoulder regions of the tire, which would be inevitably present in any tire utilizing bias belts constituted by one or more biascut fabric plies circumferentially laid about the carcass and could become a source of weakness, e.g. ply separation. Moreover, the 0° belt leads to another advantage, i.e. a maximized hoop modulus of the tire in the circumferential direction relative to the hoop modulus which a tire utilizing bias belts would have.

It is also to be noted that where the cords of the tape constituting the belt-forming structure are locally weakened, the strength and function of the final belt in the tire are nevertheless not impaired, since the weakened portions (and breaks, if any) in adjacent cords are staggered around the circumference of the tire and are not disposed laterally adjacent one another due to their having been phased relative to each other when the tape was made. Each weakened cord portion in the belt is, in fact, laterally confined between a relatively large number of full-strength cord sections, so that there is no continuous line of weakness created in the belt in the axial direction of the tire, i.e. transversely of the tread, and there is no appreciable diminution of stress transfer between the rubber of the tread and the belt cords. This will be true whether or not any of the cords are broken and even if all the cords are broken at all the weakened portions thereof.

The foregoing and other objects, characteristics and advantages of the present invention will be more clearly understood from the following detailed description of various aspects and facets thereof when read in conjunction with the accompanying drawings, in which:

FIG. 1 is a fragmentary elevational view, partly in section, of a high "soft stretch" tape according to the basic principles of the present invention and composed of a single rubber-coated cord with planar undulations, the cord being held in the undulating state by a frangible chain stitch knitted yarn;

FIG. 1a is a sectional view, on an enlarged scale, taken along the line 1a—1a in FIG. 1;

FIG. 2 is a fragmentary elevational view, partly in section, of a similar but two-cord high "soft stretch" tape, with the respective sets of undulations being disposed in parallel, side by side planes and out of phase with each other;

FIG. 3 is a fragmentary, diagrammatic, perspective view of a three-cord high "soft stretch" tape similar to that shown in FIG. 2;

Figure 13:
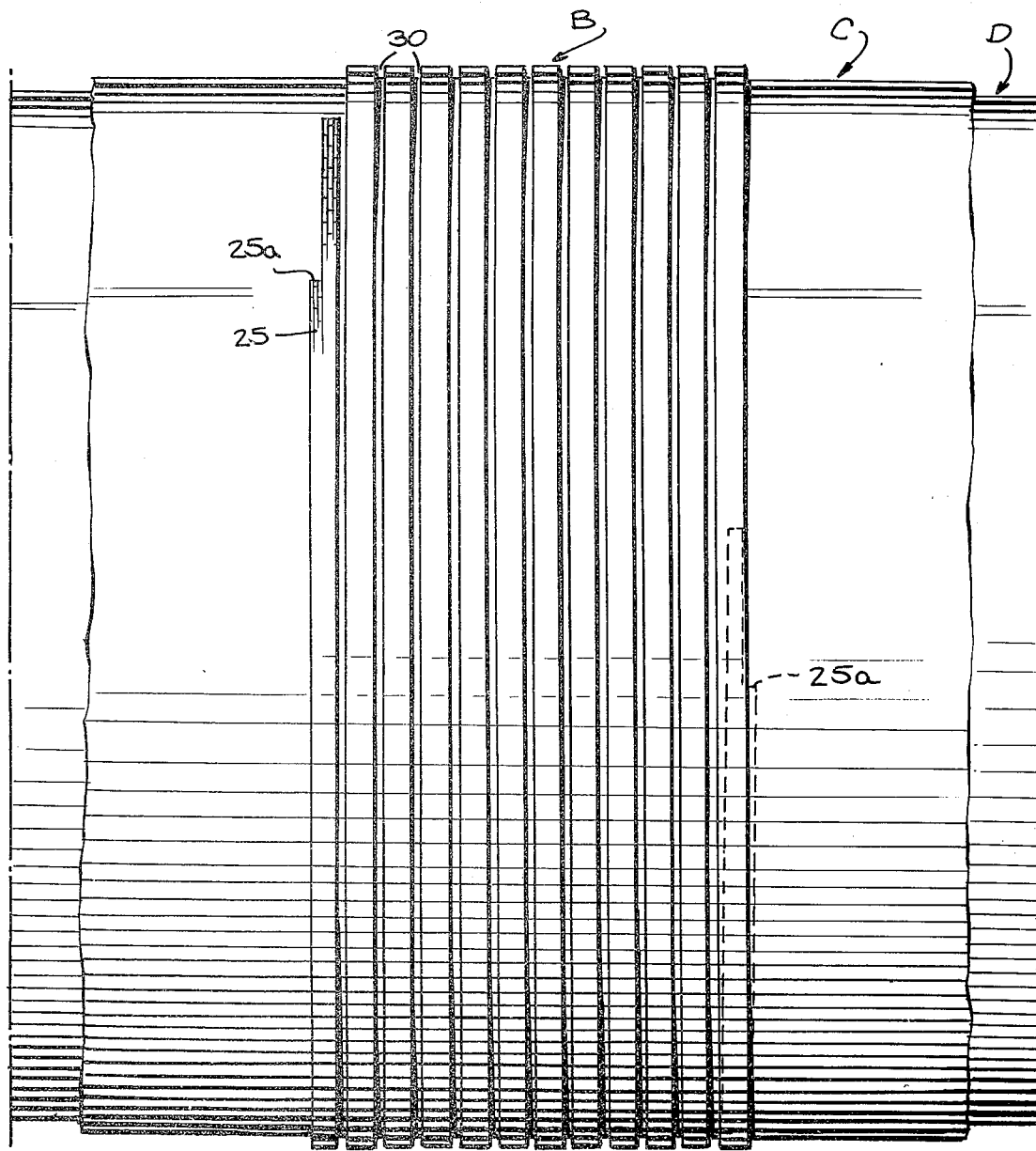
Figure 14:
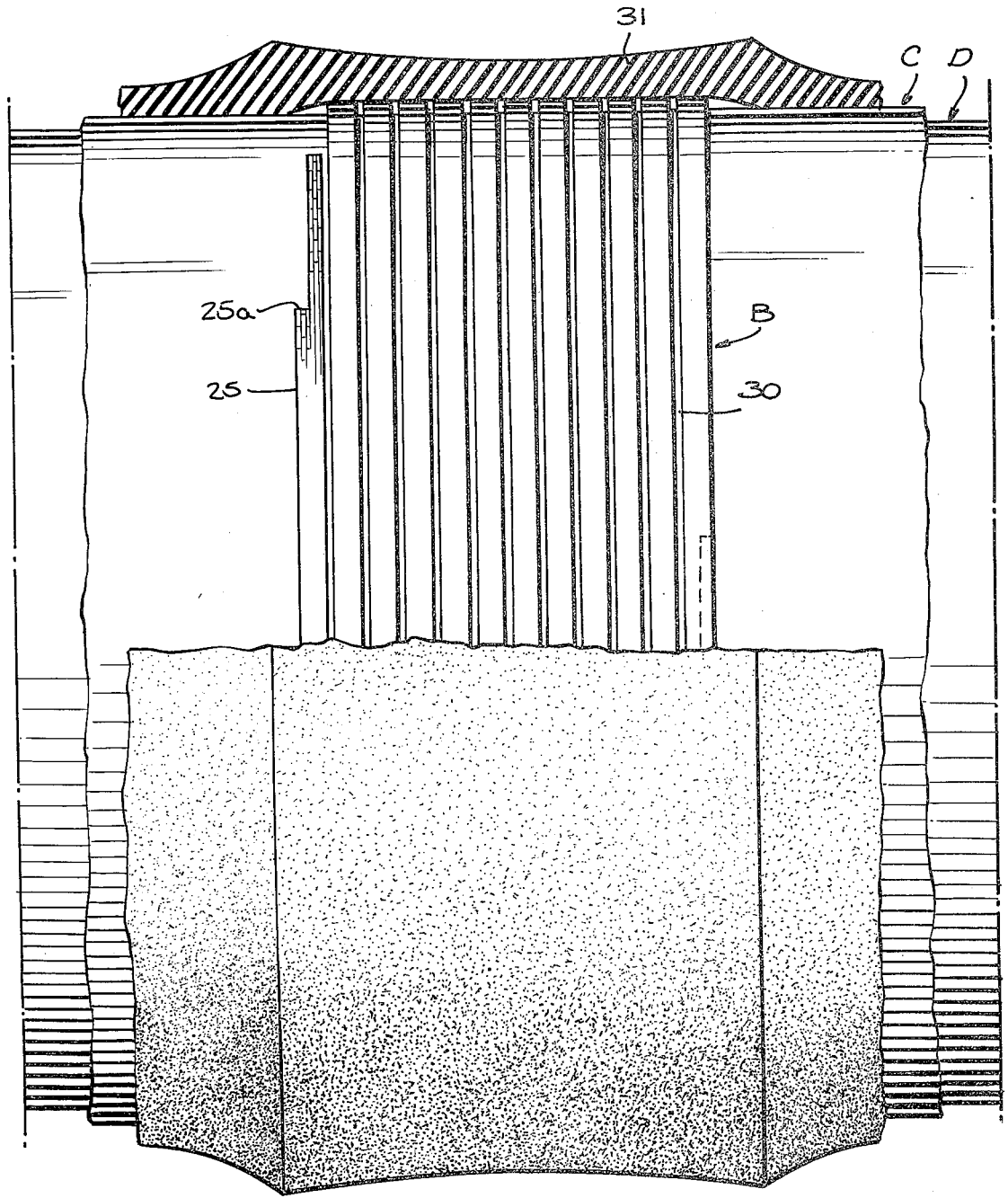
Figure 15:
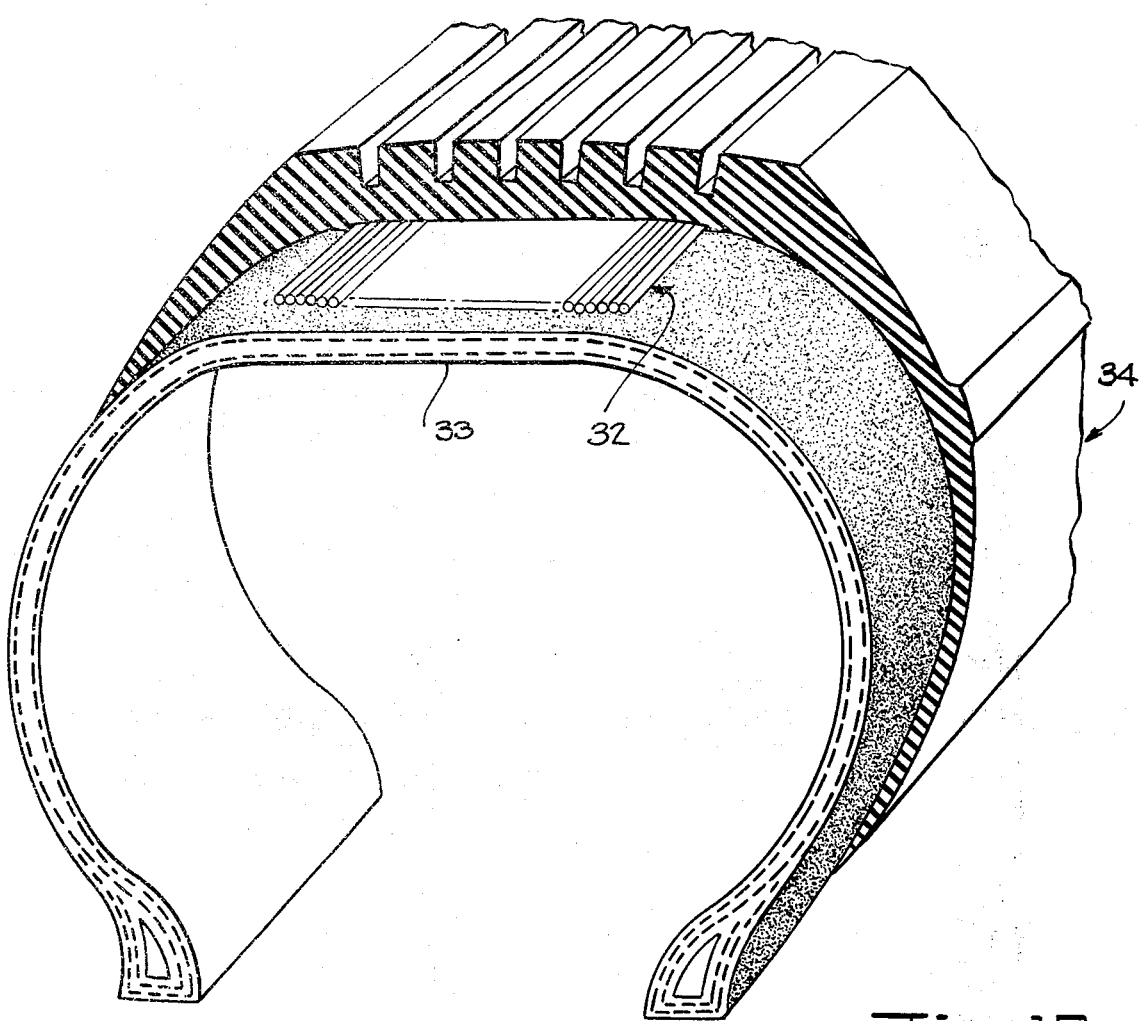
Figure 16:
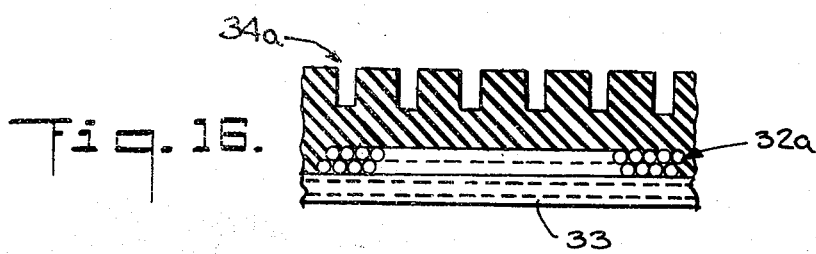
Figure 17:
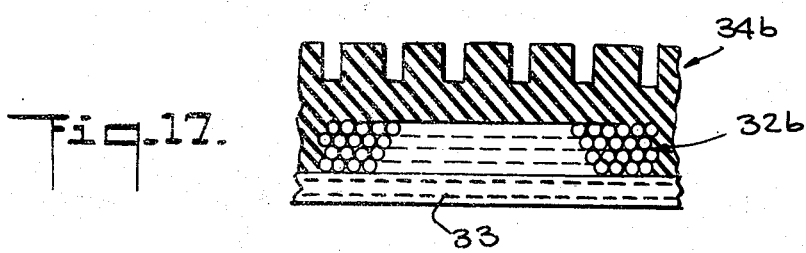
Figure 20:
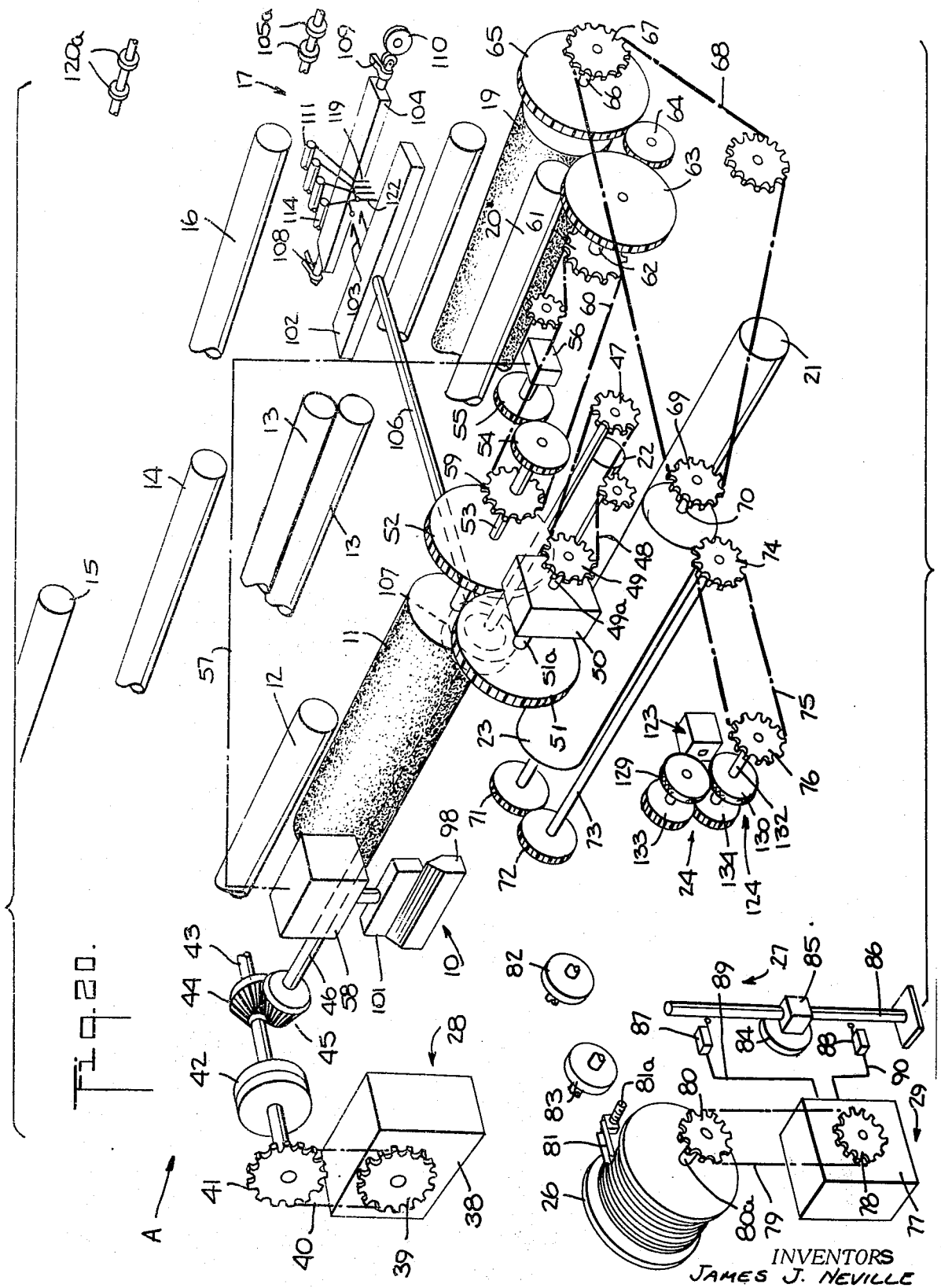

FIGS. 3a and 3b are sectional views, on enlarged scales, taken along the lines 3a—3a and 3b—3b, respectively, in FIG. 3;

FIGS. 4 and 5 are fragmentary, diagrammatic, perspective views, respectively, of six-cord and nine-cord high "soft stretch" tapes each made of an appropriate number of laterally joined three-cord tapes of the type shown in FIG. 3;

FIGS. 4a and 5a are sectional views, on an enlarged scale, taken along the lines 4a—4a and 5a—5a, respectively, in FIGS. 4 and 5;

FIG. 6 is a fragmentary elevational view, partly in section, of a one-cord wide high "soft stretch" tape formed of two cords having their respective undulations disposed in a single common plane and in nesting relation to each other;

FIG. 7 is a sectional view, on an enlarged scale, taken along the line 7—7 in FIG. 6;

FIG. 8 is a fragmentary elevational view of a five-cord wide high "soft stretch" tape formed of five side by side nested-cord tapes of the type shown in FIGS. 6 and 7;

FIG. 9 is a sectional view, on an enlarged scale, taken along the line 9—9 in FIG. 8;

FIG. 10 is a fragmentary, diagrammatic, elevational view of a one-cord wide high "soft stretch" tape formed of four mutually nested coplanar cords held in their undulating state by a strip of frangible sheet material;

FIG. 11 is a sectional view, on an enlarged scale, taken along the line 11—11 in FIG. 10;

FIG. 12 is a sectional view, on an enlarged scale, taken along the line 12—12 in FIG. 10 but shows a five-cord wide tape of nested-cord tapes of the type shown in FIG. 11;

FIGS. 13 and 14 are fragmentary, diagrammatic, plan views, the latter partly broken away, of a raw 0° belted tire according to the present invention in an intermediate state and in the final state of the building thereof, respectively, the 0° belt-forming structure being illustrated as constituted by a helically "on end" wound six-cord tape of the type shown in FIGS. 4 and 4a;

FIG. 15 is a fragmentary, partly sectional, perspective view of a 0° belted tire having a monoply belt and produced from a single-stage built raw tire including a belt-forming structure made of "on end" wound tape such as those shown in FIGS. 1 to 5;

FIGS. 16 and 17 are fragmentary axial sectional views of the crown regions of single-stage built 0° belted tires similar to that shown in FIG. 15 but including, respectively, a two-ply belt resulting from a belt-forming structure made of "on end" wound tape such as those shown in FIGS. 6 to 9, and a four-ply belt resulting from a belt-forming structure made of "on end" wound tape such as those shown in FIGS. 10 to 12;

FIG. 18 is a fragmentary, diagrammatic illustration, in perspective but not drawn to scale, of a monoply six-cord plural-wind 0° belt the starting high "soft stretch" tape of which utilized locally weakened cords according to one of the embodiments of the present invention, the belt being shown in full circumferential extent and as it would be after the radial expansion of the raw tire to illustrate a preferred distribution of the weakened portions of the various cords;

FIG. 18a is a graphic representation of a developed plan view of slightly more than two full turns of the belt shown in FIG. 18 and illustrates the staggering of the weakened cord portions across the width of the six-cord winding entity;

FIG. 19 is a schematic illustration of the basic methods of making high "soft stretch" tapes according to the present invention;

FIG. 20 is a fragmentary, partly diagrammatic, perspective illustration of an apparatus designed for the practice of one variant of the tape-forming methods representned in FIG. 19;

FIG. 21 is a fragmentary perspective illustration, on an enlarged scale, of one type of weakening device which can be utilized in the apparatus shown in FIG. 20 for locally deteriorating and weakening the cords being formed into tape;

FIGS. 22 and 22a are fragmentary sectional views, on an enlarged scale, taken along the line 22—22 in FIG. 21 and illustrate the weakening device in different stages of operation;

FIG. 23 is a fragmentary elevational view, partly in section, of a weakened cord emanating from the device shown in FIG. 21;

FIG. 24 is a fragmentary perspective view, on an enlarged scale, of an undulating and tying device which can be utilized in the apparatus shown in FIG. 20 for undulating the starting cords and securing them to each other in that state to form the desired tapes;

FIG. 24a is a graphic representation of the relative motions of the various tape-forming cords and the stabilizing yarn in the device shown in FIG. 24;

FIG. 25 is a fragmentary perspective view, on an enlarged scale, of a joining device utilized in the apparatus shown in FIG. 20 for combining two lower cord number tapes into one higher cord number tape;

FIG. 26 is a sectional view, on an enlarged scale, taken along the line 26—26 in FIG. 25; and FIG. 27 is a sectional view, on an enlarged scale, taken along the line 27—27 in FIG. 26.

Referring now to the drawings in greater detail, FIG. 1 shows a high "soft stretch" tape 1 according to one aspect of the present invention, the tape being constituted by a single, undulating cord 2 shown, merely by way of example, as being composed of a substantially inextensible filamentary cord member 3 encased in an outer covering or sheath 3' of rubber. Most advantageously, the cord is held in its undulating state by a series of loops or stitches of a relatively weak thread or yarn 4, hereinafter referred to as the stitching yarn or thread, with the line of stitches extending along the longitudinal center line or axis of symmetry of the series of undulations. Preferably, the loops of the stitching yarn, which are illustrated in greatly exaggerated fashion in FIG. 1a, are shown as being parts of a single chain of stitches one wale wide formed by warp knitting the yarn with a single needle and guide bar in a 1–0/0–1 movement, the yarn being continuously lapped around the needle and the cord being laid into the loops by being shuttled back and forth across the needle path. In actuality, of course, the loops of the stitching yarn will be tighter than as shown in FIG. 1a, to such an extent as to bite somewhat into the rubber coating 3'.

It should be noted that the term "relatively weak" as used in the foregoing context is intended to denote any thread or yarn which is made to have the strength to withstand moderate tensile forces such as might be encountered in normal handling of the tape, and yet is made to be easily frangible so as not to interfere with the straightening of the cord when the tape is subjected to relatively high forces such as might be encountered during the radial expansion and shaping of a raw tire in which the tape, helically wound circumferentially about the medial region of the tire carcass, constitutes the belt-forming structure. Ordinarily, therefore, the stitching yarn will be a conventional spun staple fiber yarn or thread of cotton, rayon or the like.

The undulations of the cord 2, as shown in FIGS. 1 and 1a, which are substantially planar in any given straight length of the tape, are generally sinusoidal, i.e. they have a configuration approximating that of a regular sine wave, but within the ambit of the present invention they may have any other type of analogously repeating substantially planar configuration, e.g. that of a square wave, a series of loops, etc., if desired. In any event, however, the plane of the undulations will be substantially perpendicular to the two parallel planes which are tangent, respectively, to the top and bottom peaks of the cord. The "soft stretch" or stretch ratio of the tape is, of course, determined by the magnitude, i.e. the peak to peak amplitude, of the undulations imparted to the cord, and for any given case the particular magnitude selected will, subject to the hereinbefore described variations, be substantially constant along the entire length of the tape and depend on the degree of radial expansion or increase in circumferential dimension which the helical belt-forming structure in the tire will undergo when the latter is transformed from its "as built" shape to its toroidal shape. Merely by way of example, to impart a stretch ratio in the range of about 1.5 to 1.9 to a tape composed of rubber-coated rayon cord about 1/16 inch in diameter, the cord may be undulated to a peak amplitude of about 3/16 inch and a pitch length of about 5/16 inch.

FIG. 2 shows a similar high "soft stretch" tape 1a which is composed of two generally sinusoidally undulating, individually rubber-coated cords 2. The respective sets of undulations of the cords are shown as being parallel to and out of phase with each other, and the cords are held in their undulating states and tied to each other by a relatively weak stitching yarn 4 knitted in the same manner as described above in connection with the one-cord tape 1, with the two cords being laid into the yarn stitches so that each loop embraces both cords at their region of intersection. (The actual arrangement in cross-section is not explicitly shown but can be readily visualized from the one-cord arrangement illustrated in FIG. 1a.)

In like manner, a three-cord tape 1b is shown in FIGS. 3, 3a and 3b, with the two outer cords 2 having their undulations out of phase with those of the middle cord, and all cords being laid into the stitches of the yarn 4 during the knitting thereof as previously described, so that each loop embraces all three cords at their region of intersection. It should again be kept in mind that the exaggerated representation of the tape 1b in FIG. 3b is rather idealized for the sake of clarity. In actuality, as in the case of the tape 1a, the stitching yarn loops will be tight enough to bite into the rubber coatings 3' of the two outer cords, as indicated in FIG. 3a, and to exert sufficient lateral forces on the portions of the cords embraced in and tied together by each stitch to squash or compact the cords somewhat. This, of course, will not effect any material change in the general parallelism and side by side relationship between the cords.

For ease of manufacture, it is preferred that the undulations of the side by side adjacent cords in any such plural-cord tape be longitudinally offset with respect to each other, most preferably in a 180° out of phase relationship as shown for the sine wave undulations in FIGS. 2 and 3 (FIG. 2 thus may be considered in effect as being a representation of all plural-cord tapes with 180° out of phase generally sinusoidal undulations when viewed in side elevation). Nevertheless, the undulations of such side by side adjacent cords in any given plural-cord tape may just as well be in lateral alignment, i.e. in phase, with each other (any such tape when viewed in side elevation would have the same appearance as the tape 1 in FIG. 1), inasmuch as the disposition and functional interrelationships of the cords once they have been straightened out are entirely independent of the original locations of the undulations. In tapes of plural side by side cords with in phase undulations, the joining of the cords to each other may be achieved by other types of relatively weak means than stitching yarns or threads, such as by suitable rubber cements, thermoplastic rubber compositions, etc.

The constructions of plural-cord tapes including even greater numbers of side by side cords (not shown), i.e. four, five, six, etc., tied together into a single matrix by one stitching yarn will be readily apparent to those skilled in the art from the foregoing description. It has been found, however, that tape production and handling requirements tend to place a practical upper limit of about four or five cords on such tapes. To this end, it is contemplated by the present invention that high "soft-stretch" plural-cord tapes of relatively higher numbers of component cords may be made of a plurality of tapes of lesser cord numbers, with the latter tapes being cemented or otherwise adhered to each other in side by side relation. Merely by way of example, there is shown in FIGS. 4 and 4a a six-cord tape 1c composed of two three-cord tapes 1b (FIGS. 3, 3a and 3b) cemented to one another in side by side relation, with both the lower number tapes being longitudinally so offset relative to each other as to cause the undulations of the respective adjoining side cords to be out of phase with each other. Similarly, FIGS. 5 and 5a show a nine-cord tape 1d built up in a similar manner of three-cord tapes 1b. The possible variants of this type of construction will, of course, also be readily apparent; thus, the six-cord tape 1c could, for example, be made of three two-cord tapes 1a, and, for that matter, any plural-cord tape could be made of any appropriate number of tapes having lower numbers of cords, even, for example, of one-cord tapes 1.

In all such constructions, however, the plane of the undulations of each cord will again be substantially perpendicular to the two parallel planes which are tangent, respectively, to the top and bottom peaks of all of the cords.

In accordance with yet another aspect of the present invention, it is further found advantageous to incorporate in any high "soft stretch" tape utilizing a relatively weak stitching yarn as the tying means, an additional relatively weak thread or yarn, such as is indicated schematically at 6 in FIG. 1a for the one-cord tape 1 and in FIGS. 3, 3a and 3b for the three-cord tape 1b. For the sake of clarity, no such yarn 6 has been shown in FIGS. 1 and 2. The yarn 6 is preferably of the same type and physical properties as the stitching yarn 4 but is laid into the stitches or loops of the latter in the same manner as the cords 2 themselves except with only a very small degree of waviness (in a plane parallel to those of the undulations of the cords) and while being maintained under a relatively high tension equal to about 70–80% of its full tensile strength. The yarn 6 thus enhances the integrity of the tape and serves as a means for stabilizing the tape against premature stretching thereof and a consequent undesired straightening of the cords during handling, thereby enabling the tape to be kept under the proper degree of tension without any risk of the stitching yarn opening up or breaking either while the tape is being drawn onto a take-up roll from the tape-forming apparatus or while the tape is being drawn from such a roll for the belt-building operation. By virtue of the method of its formation, therefore, the six-cord tape 1c (FIGS. 4 and 4a) has two stabilizing yarns 6 incorporated therein, while for the same reason the nine-cord tape 1d (FIGS. 5 and 5a) has three stabilizing yarns 6 incorporated therein.

The present invention also contemplates the provision of high "soft stretch" plural-cord tapes characterized by the presence of generally sinusoidally undulating cords arranged in nesting relation with each other and secured together by a relatively weak tying means. Merely by way of example, FIGS. 6 and 7 show a tape 1e composed of two cords 2 each composed of a cord member 3 and a rubber coating 3', the two cords being arranged in nesting relation, i.e. with each two interfitted undulations disposed in a single plane. In this embodiment, the cords are again shown as being held together in their undulating state by a relatively weak stitching yarn 4 the loops of which (not shown in plan) are formed in the same manner as described hereinbefore in connection with FIGS. 1a and 3b. (The tape 1e thus, although a two-cord tape, is only one cord wide, and the actual arrangement can be visualized by imagining the presence of two longitudinally, i.e. right/left, adjacent sectioned cord portions confined in each loop shown in FIG. 1a.) Similarly, FIGS. 8 and 9 show a five cord wide tape 1f composed of five such one cord wide dual-cord components 1e cemented to each other in side by side relation and arranged with their undulations out of phase with each other. It will be understood, of course, that any nested-cord tape more than one cord wide can also be formed as a unit, by jointly undulating the respective pairs of cords and so laying them into the loops of a common stitching yarn in the same manner as described above for the cords of the tape 1b (for example, the actual arrangement for a three cord wide nested-cord tape, not shown, can be visualized by imagining the presence of three pairs of longitudinally, i.e. right/left, adjacent sectioned cord portions confined in each loop shown in FIG. 3b).

The nested-cord principles outlined above may also be applied to greater numbers of cords than two. Thus, FIGS. 10 and 11 show a one cord wide high "soft stretch" tape 1g composed of four generally sinusoidally undulating cords 2' arranged in nesting relation, i.e. with each four interfitted undulations disposed in a single plane. In this embodiment, the cords are illustrated as being devoid of a rubber covering (they may, for example, be either untreated or treated in any of the ways hereinbefore referred to) and are shown as being held in their undulating state by means of a relatively weak and easily frangible strip 5 of a thin gauzelike fabric or like sheet material to which they are secured by means of parallel rows of sewn stitches 4' of a relatively weak cotton or like thread or yarn. The width of the strip 5 preferably will be appreciably less than the outside peak to outside peak dimension of the tape, as shown. The cords may, of course, be adhered to the strip in other ways than by sewing, as by means of a suitable cement or adhesive. This latter approach is actually to be preferred where rubber-covered cords 2 are used in the tape, since the rubber would normally tend to foul the sewing needles in short order and prevent the stitching operation from being properly carried out. As illustrated by FIG. 12, furthermore, a nested-cord tape 1h more than one cord wide and composed of a number of the tapes 1g of FIGS. 10 and 11 can be readily constructed simply by adhering a plurality of such tapes to each other in side by side relation and with the planes of the respective laterally adjacent sets of undulations substantially parallel to one another (it should be kept in mind, in this connection, that FIG. 12 is a somewhat idealized representation of the tape 1h, but although in actual practice its form may not be as precise as shown, the indicated basic relationships between the tape components will be present at all times). The undulations of each cord may, concomitantly, be either out of phase with the undulations of each next adjacent cord, as shown, or in phase therewith (not shown). As before, in all forms of the nested-cord tape, the plane of the undulations of each series of nested cords is substantially perpendicular to the tangent planes to the top and bottom peaks of the cords.

It will, of course, be readily appreciated by those skilled in the art that when a tape such as those illustrated in FIGS. 1 to 5 is used in an "on end" wound system to build a belt-forming structure of a raw tire, it will ordinarily produce a monoply belt in the finished tire. On the other hand, when a tape such as those illustrated in FIGS. 6 to 12 is used in an "on end" wound system, it will produce a multiply belt in the finished tire, without, however, requiring more than one layer of tape. More detailed reference to these aspects of the invention will be had hereinafter as the description proceeds.

All of the foregoing high "soft stretch" tape constructions, it will further be appreciated, may utilize either cords which are unweakened or cords which are locally weakened or deteriorated in any suitable manner at a multiplicity of longitudinally spaced locations, as indicated schematically at 3'' in FIG. 23 for a cord 2, to a residual tensile strength between about 5 to 20% of their starting tensile strength. Wherever weakened cords are used, however, the cords of any given tape will be combined so that the weakened portions of each cord are laterally out of alignment with the weakened portions of at least each next adjacent cord and preferably also with the weakened portions of all the cords of the same tape across the entire width thereof. Further reference to these and related aspects of the present invention will also be had hereinafter as the description proceeds.

To illustrate the basic and presently considered best method of forming high "soft stretch" tapes of plural cords in side by side, parallel plane relation according to the present invention, there will now be described the formation of one such tape construction, to wit a six-cord tape such as 1c (FIGS. 4 and 4a) from two three-cord tapes such as 1b (FIGS. 3, 3a and 3b) of locally weakened rubber-covered cords 2 (the description will, of course, apply to otherwise treated cords and even untreated cords as well). It is to be noted that although the methods and apparatus for making such tape are herein disclosed in full for purposes of completeness, they actually are the invention of J. J. Neville and D. Shichman and are disclosed and claimed in a copending application entitled "Production of High Soft Stretch Tapes of Reinforcing Cords for Molded Elastomeric Articles" filed Ser. No. 160,669, of even date herewith and assigned to the same assignee as the instant application, now U.S. Pat. No. 3,774,662 issued Nov. 27, 1973.

Referring now in particular to FIG. 19, in the tape-forming operation for this construction, the starting six cords 2, which may be considered as being in two sets of three cords each, are taken from a creel-mounted set of supply spools 7. The cords are brought into parallel side by side relation by suitable guides 8 and 9, and then move along parallel paths of travel straddled by and extending through an intermittently activated weakening device 10 where they are periodically jointly subjected to an appropriate deterioration or weakening action. The weakening of the cords may be achieved either by physical means (mechanical, electrical, thermal, etc.) or by chemical means (acid treatment, saponification, plasticization, etc.). It will be understood, of course, that not all types of cords, depending in general on the cord construction and/or the nature of the cord material, will be able to be weakened in the same manner. Basically, however, the weakening interval, i.e. the cord length between successive weakened portions for each cord of any intended tape construction, is selected to be different than, and in particular to be either an irregular fraction or an irregular multiple of, the circumferential length of one full turn of the cord in the final belt of the ultimate tire. This will ensure a non-alignment of the weakened cord portions of the belt in the axial direction of the tire, i.e. transversely of the tread, at least in successive turns of the cord.

From the device 10, the cord paths lead coextensively around a continuously driven metering roll 11 to an idler roll 12. The metering roll 11, the operation of which is synchronized with that of the weakening device 10, has a roughened or otherwise high friction exterior surface and provides the force for drawing the cords at the desired feed rate and in a slip-free manner from the supply spools 7. The paths of the three cords of each set then diverge, in the same manner indicated by the reference characters 2a-2b-2c and 2a'-2b'-2c', so that the first cords travel from the roll 12 directly to a pair of guide rolls 13, while the second and third cords travel over respective phasing rolls 14 and 15 from which they converge again to come together with the first cords at the guide rolls 13. From the latter, all the cords travel jointly to an idler roll 16 located at the entrance to an undulating and tying device 17. In this way, it will be understood, the length of the path of travel of each cord of each set of three from the roll 12 to the roll 16 is varied and adjusted relative to the length of the corresponding path traveled by each of the other cords of the same set, so that when each respective three cords reach the device 17, their originally simultaneously formed and laterally aligned weakened portions are no longer in lateral alignment with each other but are longitudinally displaced or offset with respect to each other. Concurrently therewith, two stitching yarns 4 and two stabilizing yarns 6, each of the latter tensioned to about 70–80% of its tensile strength, are fed to the device 17 from respective supply spools thereof (not shown).

In the device 17, which for this tape construction includes a warp knitting mechanism to be described in greater detail hereinafter, while two knitting needles and a pair of associated threaders are operated to knit the respective relatively weak stitching yarns 4 into two separate one wale wide chains of loops such as are shown in FIG. 3b, the three cords of each set and the associated stabilizing yarn 6 are fed individually to the location of a respective knitting needle and are jointly shuttled reciprocally thereacross, i.e. transversely of the direction of needle movement, in predetermined phased relationship to each other. With the rate of feed of the cords properly controlled, therefore, in a manner which will become clear presently, each three cords and the stabilizing yarn therefor are laid in a generally sinusoidally undulating form, of appropriately large amplitude in the case of the cords, and in side by side relation with each other across the path of movement of the associated needle and into the respective loops formed thereby, so as to be embraced at their crossover portions by the stitching yarn and thus secured and locked together into a three cord tape 18. The amplitude of the shuttling movement of the stabilizing yarn is, at the same time, very limited, so that in the final tape the stabilizing yarn is almost straight and provides the integrity, i.e. resistance to premature elongation, needed to permit further handling and processing of the tape without any diminution of its prescribed stretch ratio. Preferably, the cord shuttling is so carried out that the undulations of each cord of each tape are 180° out of phase or lateral alignment with the undulations of each next adjacent cord.

The two three-cord tapes 18 so formed are drawn away from the undulating and tying device 17 by a second continuously driven metering roll 19 disposed intermediate a pair of idler rolls 20 and 20' over which the tape is passed. The metering roll 19, like the roll 11, has a high friction exterior surface to provide for a slip-free drawing of the tapes 18 from the device 17, and its operation is synchronized with that of the metering roll 11 and the device 17. The system thus enables the amplitudes of the undulations and thereby the stretch ratio or "soft stretch" of each of the three-cord tapes 18 to be accurately controlled. From the idler roll 20', the paths of travel of the two three-cord tapes first diverge and then reconverge, in the manner indicated by the reference characters 18a and 18b, one tape traveling over a phasing roll 21 and thence to an idler roll 22, and the other tape traveling directly to the roll 22. In this way, the length of the path of travel of one of the three-cord tapes is varied and adjusted relative to the length of the path of travel of the other, so that when the tapes come together again at the roll 22, the two sets of staggered weakened portions are no longer in lateral alignment with each other but are longitudinally displaced or offset with respect to each other.

From the roll 22, the paths of travel of the two tapes 18 go under a guide roll 23 and then are straddled by an extend through a joining device 24 where a liquid cement or adhesive compatible with the rubber covering 3' of the cords is applied to the facing sides of the tapes and the latter are squeezed together and caused to adhere to each other to form a six-cord tape 25. The latter is then wound onto a suitable driven take-up spool or roll 26, its path of travel extending through and being straddled by a tensioning device 27 which is operable to control the driving of the take-up roll 26 so as to maintain the tape under a controlled tension.

A representative form of an apparatus A designed for the practice of the method of making such a six-cord tape is illustrated in FIG. 20. The apparatus, which for the sake of clarity is shown without its framework and without any indication of the passage of the cords, yarns and tapes therethrough, includes (see also FIG. 19) a common drive means 28 for all the synchronized components thereof, i.e. the weakening device 10, the metering rolls 11 and 19, the undulating and tying device 17 and the joining device 24, and a secondary drive means 29 for the take-up roll 26. The main drive means comprises an electric motor 38 driving a sprocket 39 which is connected by a chain 40 to a sprocket 41. The latter is connected via a clutch 42 to a main drive shaft 43 which carries a bevel gear 44 that is in meshing engagement with a bevel gear 45 mounted on a transverse auxiliary drive shaft 46.

The shaft 46 carries a sprocket 47 which is connected by a chain 48 to a sprocket 49 mounted on a shaft 49a connected via an adjustable reducing mechanism 50 to a shaft 51a carrying a large spur gear 51. The latter is in mesh with another spur gear 52 mounted on the shaft 53 of the metering roll 11. The shaft 53 further carries a smaller spur gear 54 which is in mesh with another spur gear 55 drivingly connected to an intermittently actuatable control switch mechanism 56, e.g. a cam-actuatable solenoid switch, operatively connected, as indicated schematically by the line 57, to the control or operating system 58 of the weakening device 10. It will be apparent, therefore, that the drive train so far descirbed is operable to rotate the metering roll 11 at any desired preselected speed for the purpose of controlling the feed rate of the starting cords through the weakening device and into the undulating and tying device, and concurrently to cause the weakening device to be repeatedly activated at time intervals corresponding to the passage of predetermined lengths of the cords through said device.

The shaft 53 still further carries a sprocket 59 connected by a chain 60 to a sprocket 61 mounted on a shaft 62. Also mounted on the latter is a spur gear 63 which is drivingly connected via a pinion 64 with another spur gear 65 mounted on the shaft 66 of the metering roll 19. The shaft 66 further carries a sprocket 67 connected by a chain 68 to a sprocket 69 mounted on the shaft 70 of the guide roll 23. A spur gear 71 also carried by the shaft 70 is in mesh with another spur gear 72 mounted on a shaft 73 coaxially with a sprocket 74 which is connected by a chian 75 with a sprocket 76 constituting the driving element of the joining device 24. It will be apparent, therefore, that the drive train just described is operable to rotate the metering roll 19 at any desired preselected speed for the purpose of controlling the feed rate of the finished three-cord tapes out of the undulating and tying device 17, and that the setting of the speed of the roll 19 relative to that of the metering roll 11 controls the stretch ratio or "soft stretch" imparted to the three-cord tapes. Concurrently, the said drive train serves to operate certain rotary elements of the joining device 24 during the uniting of the two tapes into the final six-cord tape form.

The secondary drive means 29 comprises an electric motor 77 driving a sprocket 78 which is connected by a chain 79 to a sprocket 80 secured to a shaft 80a adapted to support the take-up roll or spool 26. The motor 77, which also drives (in a manner not shown) a reciprocating traversing guide 81 through the intermediary of a ratchet shaft 81a, is electrically tied in (in a manner not shown) with the motor 38 so as to be deenergized and bring the take-up operation to a halt whenever the operation of the motor 38, and thus the tape formation, is interrupted for any reason. The motor 77 is, however, also arranged to be independently stopped and started by the operation of the tension control device 27. Merely by way of example, the latter is shown as comprising a pair of upper, coplanar idler rollers 82 and 83 journaled on spaced, parallel axes, and an intermediate, lower gravity or floating tensioning roller 84 coplanar with the rollers 82 and 83 and journaled in a bushing 85 mounted for vertical sliding movement along an upright rod 86. The arrangement is such that the finished tape leading the joining device 24 is passed in sequence over the roller 82, under the roller 84 and over the roller 83. The roller 84 thus is effectively supported by the festooned tape. At a pair of vertically spaced points along the path of travel of, and in position to be activated by, the roller 84 or an adjunct thereof are provided two limit switches 87 and 88 which are connected into the circuit of the motor 77 in a manner not explicitly shown but indicated schematically by the lines 89 and 90, the switch 87 being operable to stop the motor 77 when the roller 84 reaches the upper limit of its travel, and the switch 88 being operable to start the motor 77 when the roller 84 reaches the bottom limit of its travel.

It will be understood, therefore, that before the winding of a finished tape 25 onto the take-up roll 26 can be begun, the festoon of the tape will have to be long enough to dispose the tensioning roller 84 at the bottom end of its vertical travel path. With the motor 77 thus started, the tape is drawn out of the tension control device 27 at a slightly faster linear speed than the speed at which it is being fed thereinto from the joining device 24. Consequently, as the tape is wound onto the roll 26, the festoon of the tape between the rollers 82 and 83 starts to become shorter. If this were to continue unchecked, the tension on the tape would begin to vary significantly, i.e. to increase rapidly and continuously, as soon as the festoon had completely disappeared, which would be highly inimical to the ultimate production of uniform tires. This potential defect is avoided by the fact that well before the festoon of the tape can disappear, the tensioning roller 84 riding up in the rising bottom end of the festoon reaches the switch 87 and activates the same to stop the motor 77 and the take-up operation. Since more tape is continually being produced, however, the festoon then again begins to lengthen, which continues until the now downwardly traveling tensioning roller reaches the switch 88 and activates the same to restart the motor 77. In this manner, the tension in the tape at all times is accurately controlled to remain between prescribed acceptable limits.

Referring now to FIG. 21, the weakening device 10 of the apparatus A is shown as being a nicking mechanism which is constructed in the form of a press-like structure comprising a rigid base or framework 91 supporting a stationary lower platen 92 and a plurality of vertical guide rods 93 (only one is shown) which slidably support an upper platen 94 through the intermediary of sleeves 95 fixed to the latter. The upper platen is connected with the head 96 of a push rod 97 of a pressing mechanism (not shown) which is operated by the control system 58 (FIG. 20) under the action of the switch 56 to move the platen 94 up or down as required. The lower or base platen 92 rigidly supports an anvil structure 98 including a pair of abutment blocks 99 of identical height disposed on opposite sides of the path of movement of the cords 2, and a cutting block 100 vertically adjustably disposed between the abutment blocks, the cutting block being tapered to provide an uppermost relatively narrow edge (see also FIG. 22) which is disposed at a level somewhat below the top plane of the abutment blocks, the difference in height necessarily being less, of course, than the thickness of the cords to be weakened. Correspondingly, the upper platen 94 rigidly supports a striker member 101 the downwardly facing surface of which is entirely flat and parallel to the common plane of the upper surfaces of the abutment blocks 99.

It will be clear, therefore, that in operation, when the press is closed by the upper platen being moved down to bring the striker 101 against the abutment blocks 99, the cords will be forced against the cutting block 100 (see FIG. 22a) and will be bruised or nicked thereby, to the extent determined by the adjusted setting of the cutting block, to produce desired local deteriorations or weakenings 3'' (FIG. 23). As already mentioned, this setting should preferably be such as to leave the cords with a residual tensile strength sufficient, i.e. not less than on the order of about 5 to 20% of their full tensile strength, to enable the cords to be drawn into and processed in the undulating and tying device 17.

Referring now to FIG. 24, the undulating and tying device 17 of the apparatus A is a warp knitting mechanism adapted to knit a pair of stitching yarns 4 into two disconnected chains of loops each one wale wide, with the cords 2 and the stabilizing yarns 6 laid into the stitches. This mechanism includes (see also FIG. 20) a needle bar 102 carrying a pair of bearded knitting needles 103, one for each of the three-cord tapes to be formed, and an opposed single front guide bar 104 carrying a corresponding pair of threaders 105 to which the stitching yarns 4 are fed via suitable guide rollers 105a. The needle bar is connected at its rear edge with one end of a pusher rod 106 (FIG. 20) which in turn is connected at its other end with an eccentric 107 mounted on the auxiliary drive shaft 46, whereby the needle bar 102 is reciprocated toward and away from the front guide bar 104, as indicated by the double-headed arrow E (FIG. 24), whenever the motor 38 is running and the clutch 42 engaged. The front guide bar 104 is mounted on a rocker shaft 108 adapted to be reciprocally moved angularly about its axis and laterally linearly along its axis, as indicated by the double-headed arrows F and G (FIG. 24), thereby to enable the threaders 105 to perform their lapping movements relative to the needles 103. The rocking movements of the front guide bar are effected by means of a pair of link arms (not shown) each articulated at one end to a respective adjunct 109 of the rocker shaft 108 and at its other end to a corresponding eccentric (not shown) mounted on the drive shaft 46, while the lateral movements of the front guide bar are effected by means of an eccentric 110 also driven (in a manner not explicitly illustrated) by the shaft 46.

The undulating means of the knitting mechanism includes four transverse back guide bars 111, 112, 113 and 114 which are mounted for axial reciprocal movements, as indicated by the double-headed arrows H. Adjustably fixed to the back guide bars 111 to 114 are respective pairs of downwardly depending rods 115, 116, 117 and 118 to the bottom ends of which are secured two sets of threading tubes 119, 120, 121 and 122, respectively, the two sets of these tubes being juxtaposed to the paths of movement of the respective needles 103. The tubes 119, 121 and 122 of each set are the guide elements for the respective group of three cords 2, while the tube 120 of each set is the guide element for the respective stabilizing yarn 6 which may be fed thereto via an associated guide roller 120a (FIG. 20).

It will be understood, therefore, that the indicated movements of the back guide bars will shuttle the cords and the stabilizing yarns back and forth across the respective needle paths. To this end, the required movements of the back guide bars 111 to 114 are effected, in conventional manner, by means of a pattern drum and chain combination (not shown), or the like, driven by the main drive shaft 43 of the apparatus. The height of the pattern chain links acting on the stabilizing yarn guide bar 112 is, of course, chosen to be very small, so as to ensure that the stabilizing yarn is laid into the loops of the stitching yarn in almost straight condition, as previously indicated. At the same time, for the purposes of the illustrated tape forming operation, the links acting on the cord guide bars 111, 113 and 114 are so arranged that the guide bars 111 and 114 move in phase with each other and 180° out of phase with the guide bar 113. The links for the stabilizing yarn guide bar 112, as will be clear, may be arranged so as to cause that bar to be moved in phase either with the bars 111/114 or with the bar 113. Merely by way of example, for the formation of the two three-cord tapes 18 (which, as stated, are of the type designated 1b in FIGS. 3, 3a and 3b), the phase and amplitude scheme for the back guide bar set-up is graphically represented in FIG. 24a. The manner in which each yarn 4 is continuously knitted on the same needle 103 into a separate chain of loops or stitches each with three cords and the associated stabilizing yarn laid thereinto will be readily apparent to those skilled in the art.

Referring now to FIGS. 25 to 27, the joining device 24 of the apparatus A includes (see also FIG. 20) means 123 for applying a liquid cement or adhesive to each of the three-cord tapes, and means 124 for bringing and pressing the tapes together. The cement applicator means 123 (FIGS. 25 and 26) is shown as comprising a tapering nozzle-like member 125 provided with an internal bore 126 terminating near the tip of the member 125 in a pair of oppositely facing branch ports 126a. The nozzle member is retained in a housing 127 which also defines a pair of through passageways 127a for the two tapes 18 at the opposite faces of the member 125. A duct or tube 128 is connected to the rear end of the bore 126 to enable the cement or adhesive to be fed to the nozzle from any suitable source (not shown), preferably by a pump and under pressure.

In this manner, the facing surfaces of both three-cord tapes are coated with the cement to maximize the ultimate adhesion. It will be understood, however, that only coating one of the tapes or coating one to a greater extent than the other, may suffice as well.

The pressing means 124 is shown as comprising a pair of knurled or otherwise surface-roughened rollers 129 and 130 mounted on respective parallel shafts 131 and 132 and located in coplanar relation on opposite sides of the path of travel of the two three-cord tapes coming from the applicator 123, with their closest peripheral portions spaced by slightly less than the combined thickness of the two three-cord tapes which are to pass therebetween (see FIG. 26). The pressing rollers thus bring the tapes into intimate adhesion-promoting contact with each other. At the same time, the rollers exert a gripping force on the tapes and act to feed the finished six-cord tape 25 (which, as stated, is of the type designated 1c in FIGS. 4 and 4a) through the joining device 24 and toward the tensioning device 27 by virtue of the sprocket 76 being mounted on the shaft 132. To ensure that both rollers will rotate so as to engage the two three-cord tapes without any slippage, respective pinions or spur gears 133 and 134 in mesh with each other are also mounted on the shafts 131 and 132. The synchronization of the feeding action of the pressing rollers 129 and 130 with that of the guide roller 23 through the drive train 71 to 76 also ensures that no slack is permitted to occur in the three-cord tapes while they are being brought together.

It will be understood, of course, that in a mass production environment, the apparatus A would be provided with as large a number of set of one knitting needle 103, one front guide bar threader 105, and four back guide bar threaders 119 to 122, as the number of three-cord tapes 18 to be formed, and with as large a number of joining devices 24, take-up rolls 26, and tension control devices 27 as the number of finished six-cord tapes to be produced.

The applicability of the so far described representative tape forming apparatus and method to the formation of some of the other high "soft stretch" tape constructions herein disclosed will be clear to those skilled in the art and need be commented on but briefly. Thus, the weakening step, the device 10 and the cord phasing step would simply be omitted or bypassed if tapes made of unweakened cords were the desired end products; if one-cord tapes were the desired end products, each starting cord would simply be fed to the undulating and tying device for individual processing therein and thence directly to the take-up roll, and neither cord to cord phasing nor tape to tape phasing and joining would be required; if unitarily formed tapes of plural side by side cords were the desired end products, the tape-phasing and cementing steps would simply be omitted; if a nine-cord tape or a twelve-cord tape made of three-cord sub-tapes were the desired end product, the corresponding number of three-cord tapes would first have to be formed from an appropriate number of starting cords and then brought together, with the cementing step being expanded accordingly; and so forth.

By the same token, if a tape made of a plurality of nested cords be the desired end product, each associated set of cords to be nested would have to be undulated as a unit and so fed to the tying mechanism, being first phased, of course, if weakened. If the tying means of the tape is to be a knitted stitching yarn, the undulating and tying device may be an appropriately modified version of the device 17 as so far described. Alternatively, however, if the tying means for the tape is to be a strip 5 of weak fabric or other sheet material (FIGS. 10 to 12), the knitting mechanism part of the device 10 would have to be replaced by a laminating type mechanism (not shown) equipped with means for advancing the strip longitudinally over a table or the like disposed below the tubes 119, 121 and 122 (no stabilizing yarn 6 and guide tube 120 therefor would be required), so that the cords would be shuttled across and deposited onto the strip while the same is being advanced, thereby to achieve the desired generally sinusoidal configuration, the assembly then immediately being passed through a mechanism for securing the cords to the strip, e.g. a twin-needle sewing arrangement for a tape 1g such as is illustrated in FIG. 10.

The method of producing a 0° belted tire according to the present invention will now be described, in the first instance in a representative form as practiced with a six-cord high "soft stretch" belt-forming tape 25 (i.e. the type of tape designated 1c in FIGS. 4 and 4a) made by the method and apparatus illustrated in FIGS. 19 to 27.

In the initial stages of the building operation, the procedure is generally conventional, as the various liner and body plies of the carcass, generally designated C in FIG. 13, as well as any associated carcass components such as beads, chafer and filler strips, etc. (not shown), are first assembled on a standard low diameter building drum D, which may be either a flat drum or a shoulder drum. The term "low diameter" is here used to signify that the diameter of the drum, and thus also that of the generally cylindrical carcass built thereon, is appreciably smaller than the final diameter to which the tire will be radially expanded when being shaped into its desired toroidal form as an adjunct of the curing operation in the mold. It will also be understood that the body ply portion of the carcass C may be constituted by any desired number of plies of tire cord fabric in each of which the cords are disposed parallel to each other and oriented at such a starting angle relative to a plane perpendicular to the axis of the carcass as to be capable of ensuring that after the shaping operation the cords in such ply in the crown region of the tire will assume a prescribed angle lying between about 25° and 90° to the mid-circumferential plane of the tire.

The 0° belt-forming structure, generally designated B in FIG. 13, is then built up by helically winding the tape 25, constructed in accordance with the principles of the present invention of either unweakened or weakened cords and having the requisiste degree of "soft stretch", e.g. between about 50 and 90% in the case of most standard rim size passenger tires, for the required number of turns circumferentially about the medial region of the carcass at an angle of substantially 90° to a plane including the axis of the carcass, with the undulations of the cords disposed "on end", i.e. in planes generally normal to the carcass surface and the surface of the building drum. Here the arrangement of the cord undulation planes in perpendicular relation to the planes tangent to the cord peaks will be clearly seen to contribute materially to the stability of the tape on the tire carcass during the winding operation. As shown in FIG. 13, the tape is preferably wound with the turns of the belt-forming structure spaced slightly from each other by a gap 30 of predetermined width, the reason for which will become clear as the description proceeds.

It will be understood, of course, that in order to achieve the stated orientation of the tape turns, i.e. in a direction as nearly perpendicular to a plane including the axis of the drum and the carcass as feasible and thus as close to the truly circumferential or 0° direction (with respect to a plane perpendicular to the aforesaid plane) as physically possible, it is necessary to ensure that the helix or winding angle of the tape be as small as possible. As previously indicated, within the ambit of the present invention this means having the helix angle be not greater than about 2° and preferably less than 1°. Since, for the illustrated belt-forming structure B, the magnitude of the helix angle will basically be a function of, on the one hand, the width of the tape (its dimension axially of the drum) plus the width of the gap between two adjacent turns of the tape, and of, on the other hand, the diameter of the drum, which parameters define, respectively, the lead of the helix and the length of one turn of the tape around the circumference of the drum, in the case of a passenger tire, for example, built on a 15 inch diameter drum and including a belt-forming structure utilizing a rubber-coated rayon cord six-cord tape, the width of which is about 0.3, inch, wound "on end" with a gap of about 0.1, inch the winding angle is approximately ½° (actually about 0°29'). The angle is found by determining its tangent which is the quotient of the lead as above defined (tape width plus gas width) divided by the drum circumference, i.e. approximately 0.0085. The larger the drum diameter, of course, the wider a tape can be used without materially increasing the helix angle. Even in the case of a 15 inch diameter drum, however, the use of a nine-cord tape about 0.45 inch wide and wound with a 0.1 inch gap would only make the winding angle approximately ¾° (actually about 0°40'), and the use of a 0.6 inch wide twelve-cord tape wound with a 0.1 inch gap would only make the winding angle a shade more that ¾° (actually about 0°51'), both well within the preferred range of helix angles set forth above.

It is to be noted that in the raw tire construction shown in FIG. 13, a single tape is wound continuously over a desired width portion of the carcass, to constitute the belt-forming structure. The latter, the width of which may be less than, equal to or greater than the ultimately to be applied tread, could also be built up in other ways, however, as in two or more sections. This might entail, for example, winding up two tapes codirectionally at substantially equal helix angles, one from one lateral edge of the belt region toward the center thereof and one from the center toward the other lateral edge, or winding two tapes in opposite directions, either toward each other starting from the opposite lateral edges of the belt region or away from each other starting from the center of the belt region and in either case at subtantially equal helix or winding angles oriented either in the same or in opposite senses relative to a plane perpendicular to the axis of the carcass and the drum. Moreover, it is also deemed advisable to effectively skive the tape at the opposite lateral edges of the belt-forming structure so as to minimize any possible discontinuity in the rubber to cord stress transfer in the ultimate finished tire. Ideally, this would be achieved by making a bias cut across the width of the tape at the end extremeties thereof at an angle of, say, about 3° to 30°, and preferably about 5 to 15° or so, to the longitudinal dimension of the tape. Cutting the tape in this manner is not a practical expedient, however, and we approximate the same result, therefore, by simply peeling away and cutting off at each end of the tape, a predetermined length of the end region of the laterally outwardly facing three-cord tape component. In the case of the illustrated six-cord tape 25, a length of about 2.5 inches is cut away, as indicated at 25a in FIG. 13. In the case of a nine-cord tape of the same basic construction, the simulated skiving would be effected by cutting a length of about 5 inches off the laterally outermost three-cord tape component, and a length of about 2.5 inches off the middle three-cord component; etc.

Reverting now to the actual tire building operation, once the belted carcass is in the condition shown in FIG. 13, the building operation is completed, first by the application of any still missing interior tire components, e.g. additional filler strips, rubber plies or cushions, etc. (not shown), and finally by the addition of the exterior covering of tread rubber 31 (FIG. 14) to form the tread and sidewalls of the tire, with the tread-forming portion of the tread rubber being properly centered on the carcass C and overlying the belt-forming structure B. The tread and sidewalls may, in known fashion, be formed by fitting and appropriately butt-jointing or splicing a single full-width slab or somewhat narrower individual slabs of tread rubber about the carcass, or by continuously winding the tread rubber in relatively narrow continuous strip form for a plurality of turns around the carcass until the desired configuration has been attained. Any seam in the tread rubber should, of course, be firmly stitched and adhered to the carcass before the cylindrical raw or "green" tire is removed from the drum preparatory to being subjected to the shaping operation.

It will be understood that, although the complete tire building operation has so far been described and illustrated as being performed at one and the same station, parts of it may be performed in different locations and/or at different times. Thus, if considerations of manufacturing techniques, factory space, productivity requirements or the like so dictate, the drum D carrying the belted carcass may be transferred from the carcass building station to a remote tread applying station, or the belted carcass may be removed from the drum without any tread rubber applied thereto and then, still in cylindrical or flat band form, may be remounted at a later time onto a different drum at another station to enable the tread rubber to be applied at the latter station, or a still unbelted carcass may be transferred either on or off the building drum and then, still in its cylindrical or flat band form, be remounted for the belt building and tread rubber applying operations at another station. All of these are nevertheless deemed single-stage tire building operations as that term has been defined herein.

The single-stage built, raw 0° belted tire according to the present invention is then subjected to a shaping operation, which may be performed either preliminary to or concurrently with the start of the molding operation, as previously explained herein. During the shaping operation, the beads of the tire are displaced toward one another, and concurrently therewith the body of the tire is ballooned or radially expanded into its desired toroidal shape.

In the course of this radial expansion, the tape as an entity is subjected to substantial tensile forces which are far in excesss of the tensile strengths of the stabilizing yarns 6 and stitching yarns 4 incorporated in the tape. These yarns offer no more than a very low resistance to the extension of the tape and the straightening of the cords and actually rupture almost right at the beginning of the radial expansion of the tire. Moreover, as the shaping operation takes place and the cords straighten out, the belt-forming structure concomitantly becomes somewhat narrower. It will be apparent, therefore, that it is to facilitate this narrowing and at the same time to prevent the cords from bunching up at indeterminate locations across the width of the belt, that the winding gap 30 between the turns of the tape 25 in the belt-forming structure B is provided. The width of the gap is, of course, predetermined and selected to yield the desired cord density in the final belt without unduly increasing the helix or winding angle. Nevertheless, it should be understood that the gap may be either omitted entirely or not specifically controlled to be uniform throughout, if some bunching of the cords and a resultant non-uniformity of the belt can be tolerated.

As previously indicated, furthermore, in accordance with the present invention the "soft stretch" built into the tape may either be as nearly as possible equal to, or may be deliberately made somewhat less than, say on the order of about 1 to 3%, the ultimate full expansion or stretch ratio required. In the latter case, of course, the cords lose their undulations fully just before the radial expansion of the tire is completed, and the final part of the expansion (in the mold this would be during the forcing of the tire against the mold surfaces under the action of the high fluid pressure in the curing bladder) is accommodated by an elastic elongation of the cords, i.e. a "hard stretch". It is to guard against the possibility of excessive strain in the cords during this stage that the individual cords would normally also be locally deteriorated or weakened, preferably by being nicked or partially cut through at, a multiplicity of longitudinally spaced intervals as described.

As the end of the shaping operation, therefore, once the individual component cords of the tape 25 constituting the belt-forming structure B are straightened out and their undulations removed, the belt 32 (FIG. 15) is a monoply structure in which the cords extend about the crown region of the carcass 33 of the tire 34 (the carcass may have fewer or more plies than the two shown) in a plural-wind or six-lead screw thread-like arrangement. Moreover, since, as previously stated, the expansion occurs without any pantographing movement of the belt cords, in the final belt all cords are disposed parallel to each other and oriented at the desired 0°—approximating angle to the mid-circumferential plane of the tire, i.e. at approximately the same angle as the originally wound turns of the tape. Where the belt-forming structure is built of helically wound tape of nested cord systems, it will be clear, the final belt is a multiply structure having otherwise the same characteristics as those set forth for the monoply belt; thus, the use of a tape 1*f* such as shown in FIG. 9 wound "on end" would produce a tire 34*a* (FIG. 16) in which the belt 32*a* is a two-ply structure of parallel cords oriented in the 0° or circumferential direction and in a five-lead screw thread-like arrangement; the use of a tape 1*h* such as shown in FIG. 12 wound "on end" would produce a tire (FIG. 17) in which the belt 32*b* is a four-ply structure of parallel cords oriented in the 0° direction and in a five-lead screw thread-like arrangement; and so forth. It will further be clear that although the representative belts 32, 32*a* and 32*b* are shown in FIGS. 15, 16 and 17 as embodied in finished tires, the arrangements obviously would be the same in shaped but as yet uncured tires.

To illustrate the monoply belt construction somewhat better, the same (and except for modification dictated by the number of plies, the following description will apply to the multiply belts as well) is shown in a purely diagrammatic way in FIG. 18, where a series of weakened cord portions 35 (which will not be present, of course, in a belt made of unweakened cords) is also indicated. It should be noted that even in a weakened cord belt, however, not all of the weakened portions 35 will necessarily be ruptured or even identically strained, due to the fact that ordinarily not all the cords will be stressed equally or uniformly in the last part of the radial expansion of the tire.

It is also contemplated by the present invention that in a weakened cord belt any alignment of the weakened cord portions (or breaks, if any) in a direction parallel to the belt axis be avoided as far as possible, in order to avoid creation of a continous line of weakness of the belt in the direction transversely to the tread. The most preferred arrangement is one in which, as shown in FIG. 18, each weakened cord portion is laterally succeeded in one direction or the other parallel to the axis of the tire by at least two unweakened cord portions. To this end, the spacing of the weakened portions is selected preferably to be an irregular fraction or multiple of the circumferential length of one turn of the belt cord.

This will best be comprehended by reference to FIG. 18*a*, in which the illustrated diagram is a schematic representation of a developed plan of somewhat more than two full turns of the weakened cord belt 32 of FIG. 18 for a 70 series, 15 inch rim diameter tire. The diagram thus equivalently is a schematic representation of the straightened, locally weakened cords in a section of corresponding length of the six-cord tape 25 (or 1*c*) used to form the belt. The crosses in the six lines of the diagram represent the locations of the weakened cord portions 35. The dimension value of 84 inches, indicated twice at the bottom of FIG. 18, represents the approximate circumferential dimension of the belt for the tire under discussion at full belt diameter. Correspondingly, the dimension value of 90 inches, indicated twice at the top of FIG. 18 as well as twice more elsewhere, represents the weakening interval or spacing, i.e. the cord length between successive weakened portions formed by the device 10 (FIG. 19) in any given cord, which for this tire is seen to be more than the length of one full turn of the belt cord. Concomitantly, the dimension value of 30 inches, indicated twice in each of the upper and lower halves of the diagram, represents the longitudinal offsetting or phasing of the weakened portions of each cord in each group of three relative to those of each next adjacent cord in the same group for the tire under discussion, while the dimension value of 15 inches, indicated only once in the middle region of the diagram, represents the longitudinal offsetting or phasing of the entire set of weakened portions of each group of three cords relative to the corresponding set of weakened portions of the other group of three cords.

It will be understood that the illustrated relative dispositions of the various weakened cord portions, i.e. their non-alignment across the entire grouping of six cords in a direction at right angles to the longituinal dimensions of the cords (corresponding to the axial direction of the tire), is the end result of the combination of phasing steps performed, respectively, on the starting two groups of three cords 2 and on the subsequently formed two three-cord tapes 18 (or 1b) during the formaion of the six-cord tape 25 (or 1c) by the method illustrated in FIG. 19. In each group of three cords, of course, the phasing of the weakened portions thereof relative to each other, once established, does not undergo any change thereafter either while the cords are being undulated during the forming of the respective three-cord tape, or while the latter is being combined with the other three-cord tape, or while the belt-forming structure B shown in FIGS. 13 and 14 is being extended to its final circumferential length during the radial expansion of the tire.

By virtue of the 0° orientation of the cords in the belt 32, therefore, in combination with the weakening interval being an irregular multiple of the length of one full turn of each cord, the various weakened portions of any given cord in the belt are circumferentially staggered relative to each other about the axis of the tire, as shown, by way of example, only for the No. 1 cord in FIG. 18, i.e. they are disposed somewhat more than one full turn (360°) apart and thus are nonaligned in the axial direction. At the same time, by virtue of the relative phasing of the cords as described, none of the weakened portions of any given cord is in side by side juxtaposition to or axial alignment with a weakened portion of an immediately adjacent cord, as shown, by way of example, for one full turn of the entire series of No. 1 to No. 6 cords at the right-hand side of FIG. 18, so that each weakened cord portion is ordinarily laterally bounded by or confined between a relatively large number of unweakened cord portions. The belt thus does not have any uninterrupted line of weakness across its width, such as would inevitably be represented by a transverse splice, despite the presence of the weakened cords which also engender no appreciable loss of either circumferential or transverse modulus of the belt vis-a-vis a 0° belt having no weakened cords therein.

It should be understood that although the representative weakened cord belt construction which has so far been described is characterized by the cord length between successive weakened portions of any given cord being greater than the circumferential length of the belt, i.e. of one full turn of the belt cord, the cord weakening interval may also be less than, and in particular an irregular fraction of, the circumferential belt length. Subject to the restriction of axial non-alignment of the weakened cord portions and breaks, if any, as outlined above, therefore, the general rule to be applied in determining the weakening interval is that the spacing of the weakened portions in each cord should be equal to at least the stress transfer length, i.e. that length of the cord over which the adhesion thereof to the surrounding rubber is equal to the breaking strength of the cord, and preferably the spacing should be such that in the finished tire successive weakened portions in each cord will be a distance of more than 360°, i.e. the full belt circumference plus the stress transfer length, apart. Merely by way of example, the spacing may range from about 365° to about 385° or so.

It will furthermore be apparent that, subject to the same restriction, the cords included in and making up a high "soft stretch" tape according to the present invention may be completely severed or cut through, greater than being nicked or otherwise weakened, prior to the radial expansion of the tire. Where cords fully severed prior to the tire shaping operation are to be used, however, a slight change in the tape manufacturing method is required, in that the cutting of the cords will, as a practical matter, have to be effected after the cords have been processed through the undulating and tying device.

The basic advantage of the present invention, of course, as already pointed out, is that the provision and use of the herein disclosed high "soft stretch" tapes of cords with substantially planar and preferably generally sinusoidal undulations make possible the single-stage building of 0° belted tires, i.e. even though the belt cords are substantially inextensible and are helically wound circumferentially about the carcass at an angle of substantially 90° to a plane including the axis of the carcass. Moreover, the belt cords reach their 0° orientation without having to undergo any pantographing movements, whereby the lack of precision inherent in any change of cord angle during the tire shaping operation is effectively overcome. At the same time, the need for calendering belt cords into ply formation and for then properly bias cutting such plies to the correct starting cord angle is avoided, as is the need for subsequently splicing each such ply on the building drum, whereby any resultant dynamic unbalance and weakness in the finished tire due to the presence of such a splice is also avoided. Yet other advantages will readily suggest themselves to those skilled in the art.

It will be understood that the foregoing description of a number of representative embodiments of the present invention is for purposes of illustration only, and that the diverse structural and operational features and relationships herein disclosed are susceptible to various modifcations and changes none of which entails any departure from the spirit and scope of the present invention as defined in the hereto appended claims. Thus, merely by way of example, although the belt-forming structure preferably is built by winding the tape on with its undulations "on end", as herein described, it is contemplated by the present invention that under certain circumstances a belt-forming structure may be built of tape wound with the undulations "flat", i.e. generally lying along a substantially cylindrical locus concentric with the building drum. Also, the typing means for holding the cord or cords making up the tape in the undulating state may be a stretchable yarn or a strip of stretchable sheet material in lieu of being frangible, but in such a case, whereas the use of a frangible tying means need not be accompanied by the incorporation of a stabilizing yarn in the tape (although it preferably is), a stretchable tying means must be accompanied by a stabilizing yarn of sufficient strength to give the tape the required integrity, i.e. to provide resistance to premature elongation of the tape and thereby to compensate for the yieldability of the tying means which otherwise would permit a loss of stretch ratio of the tape during the building of the belt-forming structure. Where the tying means is a yarn, furthermore, in lieu of a series of loops disposed, as shown herein, in a single line substantially along the longitudinal midline of the tape and each embracing and confining a respective one, or a respective laterally adjacent group, of the transitional portions of the cord or cords, the tying means may be in the form of more than one series of loops, e.g. two parallel, one wale wide, disconnected chains of loops warp knitted of separate stitching yarns by two separate needles, with the cord or cords laid into both chains of loops by being shuttled back and forth across both needle paths. In a tape of this type using frangible stitching yarns, the use of a stabilizing yarn may, if desired, actually be dispensed with, since its function will probably be effectively achieved by the concerted action of the several stitching yarns.

Having thus described the invention, what we claim and desire to protect by Letters Patent is:

1. A high "soft stretch" tape of reinforcing cord for a molded elastomeric article intended to undergo an expansion of at least about 20% after incorporation of the tape therein, comprising:
  A. at least one reinforcing cord,
    1. said cord having a multiplicity of undulations therein
    2. which in any given straight length of the tape are substantially planar,
    3. whereby the tape can be elongated, without any stretching of said cord, by straightening of the latter to remove said undulations therefrom, and
    4. said cord being locally weakened at a multiplicity of longitudinally spaced portions thereof; and
  B. relatively weak tying means
    1. acting on said cord and
    2. releasably holding the same in the undulating state thereof,
    3. said tying means being constructed
      a. to hold said cord against straightening out under moderate forces such as are applied to the tape in normal handling thereof
      b. but to yield and permit said cord to straighten out under appreciably higher forces such as are applied to the tape when the same is incorporated in said article and the latter undergoes an expansion;
  C. the magnitude of said undulations of said cord being predetermined to provide a tape stretch ratio, defined as the ratio of the length of said cord when unstretched but fully straight to the length of the tape when said cord is undulated, which is
    1. at least about 1.2,
    2. no greater than substantially equal to the expansion ratio of said article, defined as the ratio of a given dimension of said article after the same is expanded to the corresponding dimension of said article before the same is expanded, and
    3. no smaller than said expansion ratio less approximately the capability of said cord to elongate by strain, by partial untwisting, and by rupture at said weakened portions.

2. A tape according to claim 1, wherein the extent of weakening of said cord is sufficient to reduce the tensile strength thereof at each of said weakened portions to between about 5% and about 20% of its full tensile strength.

3. A tape according to claim 1, said cord being provided with a plurality of nicks spaced from each other along said cord, each of said nicks constituting a respective one of said weakened portions.

4. A tape according to claim 3, wherein the depths of said nicks are sufficient to reduce the tensile strength of said cord at each of the nicked portions thereof to between about 5% and about 20% of its full tensile strength.

5. A tape according to claim 3, wherein the spacing of adjacent nicks from one another is equal to at least the stress transfer length of said cord, defined as the length thereof over which the adhesion of the surrounding elastomer material to the cord in the fully molded article is equal to the breaking strength of the cord.

6. A tape according to claim 1, wherein said cord has a body made of a material selected from the group consisting of metallic and nonmetallic fibers.

7. A tape according to claim 6, wherein said cord has an individual coating of rubber on said body over the entire length thereof, each of said weakened portions extending through the rubber coating and into said body of said cord.

8. A tape according to claim 6, wherein said cord material is rayon.

9. A tape according to claim 6, wherein said cord material is glass.

10. A tape according to claim 6, wherein said cord material is metal wire.

11. A tape according to claim 6, wherein said cord material is nylon.

12. A tape according to claim 6, wherein said cord material is polyester.

13. A tape according to claim 1, wherein said stretch ratio of said tape is between about 1.2 and about 4.

14. A tape according to claim 1, wherein said stretch ratio of said tape is between about 1.5 and about 1.9.

15. A tape according to claim 1, said tying means comprising at least one frangible stitching yarn defining at least one series of loops coextensive with the length of the tape, said loops embracing respective portions of said cord at said undulations and releasably confining adjacent ones of said portions against longitudinal separation from each other.

16. A tape according to claim 15, further comprising a frangible stabilizing yarn extending longitudinally of the tape in an almost straight condition, said stabilizing yarn being held in the tape jointly with said cord by said loops of said stitching yarn, the strength of said stabilizing yarn being sufficient to prevent a premature opening of said loops under said moderate forces but insufficient to withstand said higher forces.

17. A tape according to claim 15, wherein said stitching yarn defines a single series of loops disposed substantially along the longitudinal midline of said undulations.

18. A tape according to claim 17, wherein said stitching yarn is warp-knitted in a 1-0/0-1 pattern to define said series of loops, said cord being laid into said loops.

19. A tape according to claim 18, wherein said undulations of said cord are generally sinusoidal.

20. A tape according to claim 19, further comprising a frangible stabilizing yarn extending longitudinally of the tape in an almost straight condition, said stabilizing yarn being held in the tape jointly with said cord and substantially along the longitudinal midline of said undulations by said loops of said stitching yarn, the strength of said stabilizing yarn being sufficient to prevent a premature opening of said loops under said moderate forces but insufficient to withstand said higher forces.

21. A tape according to claim 20, said stabilizing yarn being tensioned to about 70–80% of its full tensile strength.

22. A tape according to claim 1, said tying means comprising a strip of frangible sheet material coextensive with the length of the tape, said cord being secured to a face of said strip with the plane of each of said undulations parallel to the plane of said strip.

23. A tape according to claim 22, said cord being secured to said strip by sewn stitches of a frangible stitching yarn.

24. A tape according to claim 22, said cord being adhesively secured to said strip.

25. A tape according to claim 22, wherein said sheet material is a gauze-like fabric.

26. A tape according to claim 22, wherein the tape comprises at least two cords with substantially identical generally sinusoidal undulations and with corresponding weakened portions, said cords being arranged in nesting relation to each other with each undulation of each cord in a common plane with the interfitting undulation of each other cord, all cords being secured to said face of said strip, and said weakened portions of each cord being out of lateral alignment with the weakened portions of at least each next adjacent cord.

27. A tape according to claim 26, wherein the extent of weakening of each cord is sufficient to reduce the tensile strength thereof at each of said weakened portions to between about 5% and about 20% of its full tensile strength.

28. A tape according to claim 26, each of said cords being provided with a plurality of nicks spaced from each other along the respective cord, each of said nicks in each cord constituting a respective one of said weakened portions thereof.

29. A tape according to claim 28, wherein the depths of said nicks are sufficient to reduce the tensile strength of each cord at each of the nicked portions thereof to between about 5% and about 20% of its full tensile strength.

30. A tape according to claim 1, wherein the tape comprises a plurality of cords with substantially identical undulations and with corresponding weakened portions, said tying means being secured to all of said cords for both holding them in their respective undulating states and binding them together into a unitary structure, and said weakened portions of each cord being out of lateral alignment with the weakened portions of at least each next adjacent cord.

31. A tape according to claim 30, wherein each of said cords has an individual coating of rubber thereon over its entire length, each of said weakened portions extending through the rubber coating and into the body of the respective cord.

32. A tape according to claim 30, said cords being arranged in side by side relation with the plane of each undulation of each cord being substantially parallel to the plane of the corresponding undulation of each next adjacent cord.

33. A tape according to claim 32, said undulations of each cord being out of lateral alignment with the undulations of each next adjacent cord.

34. A tape according to claim 32, said undulations of each cord being in lateral alignment with the undulations of each next adjacent cord.

35. A tape according to claim 32, wherein the tape at at least one end thereof is effectively skived across its width at an angle of between about 3° and about 30° to the longitudinal dimension of the tape.

36. A tape according to claim 32, said tying means comprising a frangible stitching yarn defining a series of loops coextensive with the length of the tape, each of said loops embracing a respective set of laterally adjacent portions of said cords at said undulations.

37. A tape according to claim 32, said undulations being generally sinusoidal, said tying means comprising a frangible stitching yarn warp-knitted in a 1–0/0–1 pattern into a chain stitch formation of loops coextensive with the length of the tape, each of said loops embracing a respective laid-in set of laterally adjacent portions of said cords at said undulations, and the tape further comprising a frangible stabilizing yarn extending longitudinally of the tape in an almost straight condition, respective portions of said stabilizing yarn being embraced by said loops jointly with the laterally adjacent portions of said cords, the strength of said stabilizing yarn being sufficient to prevent a premature opening of said loops under said moderate forces but insufficient to withstand said higher forces.

38. A tape according to claim 37, said undulations of each cord being out of phase with the undulations of each next adjacent cord.

39. A tape according to claim 30, wherein said cords are arranged in nesting relation to each other so that each undulation of each cord is in a common plane with the interfitting undulation of the next adjacent cord.

40. A tape according to claim 39, said tying means comprising a frangible stitching yarn defining a series of loops coextensive with the length of the tape, each of said loops embracing at said undulations a respective set of cord portions which are in coplanar overlying relation with each other in the longitudinal direction of the tape.

41. A tape according to claim 39, said undulations being generally sinusoidal, said tying means comprising a frangible stitching yarn warp-knitted in a 1–0/0–1 pattern into a chain stitch formation of loops coextensive with the length of the tape, each of said loops embracing at said undulations a respective laid-in set of cord portions which are in coplanar overlying relation with each other in the longitudinal direction of the tape, and the tape further comprising a frangible stabilizing yarn extending longitudinally of the tape in an almost straight condition, respective portions of said stabilizing yarn being embraced by said loops jointly with the adjacent ones of said mutually overlying cord portions, the strength of said stabilizing yarn being sufficient to prevent a premature opening of said loops under said moderate forces but insufficient to withstand said higher forces.

42. A tape according to claim 1, wherein the tape comprises a plurality of cords each having a respective set of undulations and a respective multiplicity of weakened portions, and said tying means comprises an adhesion-producing substance applied to at least one of each two adjacent cords at least at a plurality of spaced points, said adjacent cords being in contact with and adhesively secured to each other at least at said points, and said weakened portions of each cord being out of lateral alignment with the weakened portions of each next adjacent cord.

43. A tape according to claim 42, wherein said adhesion-producing substance is in the form of a coating of a tacky material applied to each cord individually over its entire length.

44. A tape according to claim 1, wherein said cord is entirely severed or cut through at a plurality of points along its length.

45. A tape according to claim 44, wherein the tape comprises a plurality of cords each having a respective set of undulations and being entirely severed or cut through at a plurality of points along its length, the cuts in each cord being out of lateral alignment with the cuts in at least each next adjacent cord.

46. A tape according to claim 1, wherein said cord is treated over its entire length with a coating of a material effective to enhance the adhesion of said cord to the elastomeric material to be reinforced thereby.

47. A tape according to claim 46, wherein the tape comprises a plurality of cords each individually treated over its entire length with a coating of a material effective to enhance the adhesion of said cords to the elastomeric material to be reinforced thereby.

48. A high "soft stretch" tape of reinforcing cord for a molded elastomeric article intended to undergo an expansion of at least about 20% after incorporation of the tape therein, comprising:
  A. a plurality of reinforcing cords disposed in side by side relation,
    1. each of said cords having a respective multiplicity of substantially identical undulations therein
    2. which in any given straight length of the tape are substantially planar and both substantially parallel to and out of lateral alignment with the undulations of each next adjacent cord, with the plane of said undulations in each cord being substantially perpendicular to the two parallel planes which are tangent, respectively, to the top and bottom peaks of said cords,
    3. whereby the tape can be elongated, without any stretching of said cords, by straightening of the latter to remove said undulations therefrom; and
  B. relatively weak tying means
    1. acting on said cords and
    2. releasably holding the same in the undulating states and relative positions thereof,
    3. said tying means being constructed
      a. to hold said cords against straightening out under moderate forces such as are applied to the tape in normal handling thereof
      b. but to yield and permit said cords to straighten out under appreciably higher forces such as are applied to the tape when the same is incorporated in said article and the latter undergoes an expansion;
  C. the magnitude of said undulations of said cords being predetermined to provide a tape stretch ratio, defined as the ratio of the length of each unstretched cord when fully straight to the length of the tape when said cords are undulated, which is
    1. at least about 1.2, and
    2. no greater than substantially equal to the expansion ratio of said article, defined as the ratio of a given dimension of said article after the same is expanded to the corresponding dimension of said article before the same is expanded.

49. A tape according to claim 48, each of said cords being at full strength throughout its length, and said stretch ratio of the tape additionally being no smaller than said expansion ratio less the elastic strain capability of said cords.

50. A tape according to claim 48, wherein the tape at at least one end thereof is effectively skived across its width at an angle of between about 3° and about 30° to the longitudinal dimension of the tape.

51. A tape according to claim 48, said tying means comprising a frangible stitching yarn defining a series of loops coextensive with the length of the tape, each of said loops embracing a respective set of laterally adjacent portions of said cords at said undulations.

52. A tape according to claim 48, said undulations being generally sinusoidal, said tying means comprising a frangible stitching yarn warp-knitted in a 1–0/0–1 pattern into a chain stitch formation of loops coextensive with the length of the tape, each of said loops embracing a respective laid-in set of laterally adjacent portions of said cords at the regions of intersection of said undulations, and the tape further comprising a frangible stabilizing yarn extending longitudinally of the tape in an almost straight condition, respective portions of said stabilizing yarn being embraced by said loops jointly with the laterally adjacent portions of said cords, the strength of said stabilizing yarn being sufficient to prevent a premature opening of said loops under said moderate forces but insufficient to withstand said higher forces.

53. A tape according to claim 52, wherein each of said cords has an individual coating of rubber thereon over its entire length.

54. A tape according to claim 48, wherein each of said cords has a body made of a material selected from the group consisting of metallic and non-metallic fibers.

55. A tape according to claim 54, wherein each of said cords has an individual coating of rubber on said body over the entire length thereof.

56. A tape according to claim 54, wherein said cord material is rayon.

57. A tape according to claim 54, wherein said cord material is glass.

58. A tape according to claim 54, wherein said cord material is metal wire.

59. A tape according to claim 54, wherein said cord material is nylon.

60. A tape according to claim 54, wherein said cord material is polyester.

61. A tape according to claim 48, wherein said stretch ratio of said tape is between about 1.2 and about 4.

62. A tape according to claim 48, wherein said stretch ratio of said tape is between about 1.5 and about 1.9.

* * * * *